US008737955B2

(12) United States Patent
Salonen

(10) Patent No.: US 8,737,955 B2
(45) Date of Patent: *May 27, 2014

(54) MANAGING RECURRING PAYMENTS FROM MOBILE TERMINALS

(75) Inventor: Jukka Salonen, Helsinki (FI)

(73) Assignee: Bookit Oy Ajanvarauspalvelu, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/529,737

(22) Filed: Jun. 21, 2012

(65) Prior Publication Data

US 2012/0323789 A1  Dec. 20, 2012

Related U.S. Application Data

(63) Continuation-in-part of application No. 12/944,749, filed on Nov. 12, 2010, and a continuation-in-part of (Continued)

(30) Foreign Application Priority Data

| Aug. 21, 2001 | (FI) | 20011680 |
| Dec. 2, 2005 | (FI) | 20051245 |
| May 2, 2006 | (FI) | 20060419 |
| May 2, 2006 | (FI) | 20060420 |
| Jul. 4, 2008 | (FI) | 20085701 |

(51) Int. Cl.
H04M 11/00 (2006.01)
H04W 4/24 (2009.01)

(52) U.S. Cl.
CPC .................... *H04W 4/24* (2013.01)
USPC ........................ 455/406; 455/407; 455/408

(58) Field of Classification Search
USPC ............... 455/405, 406, 407, 408, 410, 411, 455/414.1; 705/34, 39, 40, 44, 65, 64
See application file for complete search history.

(56) References Cited

U.S. PATENT DOCUMENTS

| 5,592,666 A | 1/1997 | Perez |
| 5,838,965 A | 11/1998 | Kavanagh et al. |

(Continued)

FOREIGN PATENT DOCUMENTS

| CN | 1675637 A | 9/2005 |
| EP | 0881802 A1 | 2/1998 |

(Continued)

OTHER PUBLICATIONS

Mobileway, "Mobileway launches is Mobile Transaction Tracker solution - an interactive platform to authenticate macropayment made by mobile consumer," http://www.mobileway.com/pp./newsevents/pressrelease, Mobileway, 2002, pp. 1-2.

(Continued)

*Primary Examiner* — Jean Gelin
(74) *Attorney, Agent, or Firm* — Barnes & Thornburg LLP

(57) ABSTRACT

Equipments and methods are disclosed for facilitating service provisioning in a system that comprises a payment processor, a number of service providers and a mediator that mediates information exchange between the payment processor and service providers, and a mobile terminal operated by payment card holder. In some implementations, service provisioning can be facilitated in cases wherein the payment processor must reside in a strictly regulated Payment Card Industry (PCI) compliant environment and the service providers operate servers that are not PCI-compliant.

28 Claims, 13 Drawing Sheets

Related U.S. Application Data

(63) application No. 13/002,512, filed on Feb. 9, 2011, and a continuation-in-part of application No. 13/074,037, filed on Mar. 29, 2011, and a continuation-in-part of application No. 13/039,338, filed on Mar. 3, 2011, and a continuation-in-part of application No. 12/972,610, filed on Dec. 20, 2010, and a continuation-in-part of application No. 12/958,870, filed on Dec. 2, 2010, and a continuation-in-part of application No. 12/401,392, filed on Mar. 10, 2009, and a continuation-in-part of application No. 12/226,878, filed on Feb. 2, 2009, now Pat. No. 8,254,531, and a continuation-in-part of application No. 12/226,876, filed on Feb. 6, 2009, now Pat. No. 8,260,330, and a continuation-in-part of application No. 13/332,409, filed on Dec. 21, 2011, and a continuation-in-part of application No. 13/452,229, filed on Apr. 20, 2012, and a continuation-in-part of application No. 13/452,311, filed on Apr. 20, 2012, said application No. 12/944,749 is a continuation-in-part of application No. 11/980,470, filed on Oct. 31, 2007, now Pat. No. 8,050,664, which is a continuation of application No. 10/227,194, filed on Aug. 21, 2002, now Pat. No. 7,406,429.

(56) References Cited

U.S. PATENT DOCUMENTS

| | | |
|---|---|---|
| 5,940,818 A | 8/1999 | Malloy et al. |
| 5,987,467 A | 11/1999 | Ross et al. |
| 6,003,036 A | 12/1999 | Martin |
| 6,085,100 A | 7/2000 | Tarnanen |
| 6,104,870 A | 8/2000 | Frick et al. |
| 6,199,076 B1 | 3/2001 | Logan et al. |
| 6,327,578 B1* | 12/2001 | Linehan ............ 705/65 |
| 6,539,360 B1 | 3/2003 | Kadaba |
| 6,560,456 B1 | 5/2003 | Lohtia et al. |
| 6,564,261 B1 | 5/2003 | Gudjonsson et al. |
| 6,625,461 B1 | 9/2003 | Bertacchi |
| 6,639,919 B2 | 10/2003 | Kroninger et al. |
| 6,990,332 B2 | 1/2006 | Vihinen |
| 6,996,542 B1* | 2/2006 | Landry ............ 705/40 |
| 7,149,537 B1 | 12/2006 | Kupsh et al. |
| 7,154,060 B2 | 12/2006 | Rosenbaum et al. |
| 7,222,081 B1 | 5/2007 | Sone |
| 7,406,429 B2 | 7/2008 | Salonen |
| 7,451,118 B2 | 11/2008 | McMeen et al. |
| 7,610,208 B2 | 10/2009 | Salonen |
| 7,610,224 B2 | 10/2009 | Spiegel |
| 7,619,584 B2 | 11/2009 | Wolf |
| 7,660,397 B2 | 2/2010 | Heen et al. |
| 8,050,664 B2 | 11/2011 | Salonen |
| 2001/0037264 A1 | 11/2001 | Husemann et al. |
| 2002/0016765 A1 | 2/2002 | Sacks |
| 2002/0028686 A1 | 3/2002 | Kagi |
| 2002/0032589 A1 | 3/2002 | Shah |
| 2002/0059146 A1 | 5/2002 | Keech |
| 2002/0080822 A1 | 6/2002 | Brown et al. |
| 2002/0104007 A1 | 8/2002 | Moodie et al. |
| 2002/0111914 A1 | 8/2002 | Terada et al. |
| 2002/0165000 A1 | 11/2002 | Fok |
| 2002/0169719 A1* | 11/2002 | Dively et al. ............ 705/40 |
| 2002/0173319 A1 | 11/2002 | Fostick |
| 2002/0188562 A1 | 12/2002 | Igarashi et al. |
| 2002/0191795 A1 | 12/2002 | Wills |
| 2003/0069922 A1* | 4/2003 | Arunachalam ............ 709/203 |
| 2003/0163536 A1 | 8/2003 | Pettine, Jr. |
| 2003/0211844 A1 | 11/2003 | Omori |
| 2004/0064351 A1* | 4/2004 | Mikurak ............ 705/7 |
| 2004/0128158 A1 | 7/2004 | Salonen |
| 2004/0128173 A1 | 7/2004 | Salonen |
| 2004/0139318 A1 | 7/2004 | Fiala et al. |
| 2004/0157628 A1 | 8/2004 | Daniel et al. |
| 2004/0185883 A1 | 9/2004 | Rukman |
| 2004/0198322 A1 | 10/2004 | Mercer |
| 2005/0027608 A1 | 2/2005 | Weismuller et al. |
| 2005/0054286 A1 | 3/2005 | Kanjilal et al. |
| 2005/0065995 A1 | 3/2005 | Milstein et al. |
| 2005/0102230 A1 | 5/2005 | Haidar |
| 2005/0149544 A1* | 7/2005 | Bishop et al. ............ 707/101 |
| 2005/0171738 A1 | 8/2005 | Kadaba |
| 2005/0246209 A1 | 11/2005 | Salonen |
| 2005/0268107 A1 | 12/2005 | Harris et al. |
| 2006/0010085 A1 | 1/2006 | McMeen et al. |
| 2006/0040682 A1 | 2/2006 | Goertz et al. |
| 2006/0075139 A1 | 4/2006 | Jungek |
| 2006/0131385 A1 | 6/2006 | Kim |
| 2006/0224407 A1 | 10/2006 | Mills |
| 2006/0271551 A1 | 11/2006 | Suojasto |
| 2007/0010266 A1 | 1/2007 | Chaudhuri |
| 2007/0047533 A1 | 3/2007 | Criddle et al. |
| 2007/0135101 A1 | 6/2007 | Ramati et al. |
| 2007/0143230 A1 | 6/2007 | Narainsamy et al. |
| 2007/0239578 A1 | 10/2007 | Gaida |
| 2008/0040469 A1* | 2/2008 | Nishi ............ 709/223 |
| 2008/0147408 A1 | 6/2008 | Da Palma et al. |
| 2008/0317224 A1 | 12/2008 | Salonen |
| 2009/0281929 A1 | 11/2009 | Boitet et al. |
| 2010/0312657 A1 | 12/2010 | Coulter et al. |
| 2011/0173017 A1 | 7/2011 | Salonen |

FOREIGN PATENT DOCUMENTS

| | | |
|---|---|---|
| EP | 0967754 A2 | 12/1999 |
| EP | 1065899 A1 | 1/2001 |
| EP | 1065899 A1 | 3/2001 |
| EP | 1546938 | 8/2002 |
| EP | 1458201 A1 | 9/2004 |
| FI | 20011680 | 8/2001 |
| FI | 117663 B1 | 12/2006 |
| FI | 20060387 A1 | 10/2007 |
| FI | 118586 B | 12/2007 |
| GB | 2391646 A | 6/2002 |
| GB | 2465565 A | 8/2007 |
| KR | 20040013261 A | 2/2004 |
| WO | 9706603 A2 | 2/1997 |
| WO | 0041102 A2 | 7/2000 |
| WO | 0052601 A1 | 9/2000 |
| WO | 0139033 A1 | 5/2001 |
| WO | 0153991 A1 | 7/2001 |
| WO | 02067602 A1 | 8/2002 |
| WO | 2004019223 A1 | 3/2004 |
| WO | 2006122399 A1 | 11/2006 |
| WO | 2007063179 A1 | 6/2007 |
| WO | 2007122292 A1 | 11/2007 |
| WO | 2007125171 A1 | 11/2007 |
| WO | 2008017695 A2 | 2/2008 |
| WO | 2010000949 A1 | 1/2010 |

OTHER PUBLICATIONS

International Search Report for PCT/FI2013/050432 dated Apr. 18, 2013.
bmd wireless AG, Wireless Application messaging server, Unknown 2004.
Content Gateway, Version 4.0. "Development and Billing manual," Jan. 1, 2005, Telia Sonera Finland Oy, www.sonera.fi/files/sonera.fi/.
Elisa Plc's press release. "Innovative solution receives 2004 European Good PRactice Award in oppupational health and safety," and the appendix: "BookIT case.pdf," Nov. 22, 2004.
Elisa Plc's press release. "Bookit Ltd and Elisa implement a handy mobile phone-enabled check-in service for Finnair," Jun. 9, 2004, www.elisa.fi.
Empower Interactive Group Ltd. "Virtual Mobile Redirector—Product Information Document," Unknown 2001.
Finnair Plc's press release. "Finnair to introduce the world's easiest check-in-with a text message," Jun. 9, 2004, www.bookit.net/news.
Finnish Search Report, dated May 4, 2006.
Finnish Search Report, dated Jun. 3, 2009.

(56) References Cited

OTHER PUBLICATIONS

Penttinen, J. "GSM-tekniikka, WSOY," Unknown 1999, pp. 155-157, 222, & 331-332, Porvoo.

Kauppalehti, "Mobiilipalvelujen oltava yksinkertaisia: BookIT:n Jukka Salonen uskoo tavallisiin tekstiviesteihin," Heikki Nenonen, Jun. 9, 2005, p. 19.

Mouly et al. "The GSM System for mobile Communications," Unknown 1992, pp. 556-560, Palaiseau.

Verkkouutiset Feb. 21, 2001, "Sonera tarjoaa matkaviestinoperaattroeille Content Gateway-palvelualustaa", www.verkkouutiset.fi.

\* cited by examiner

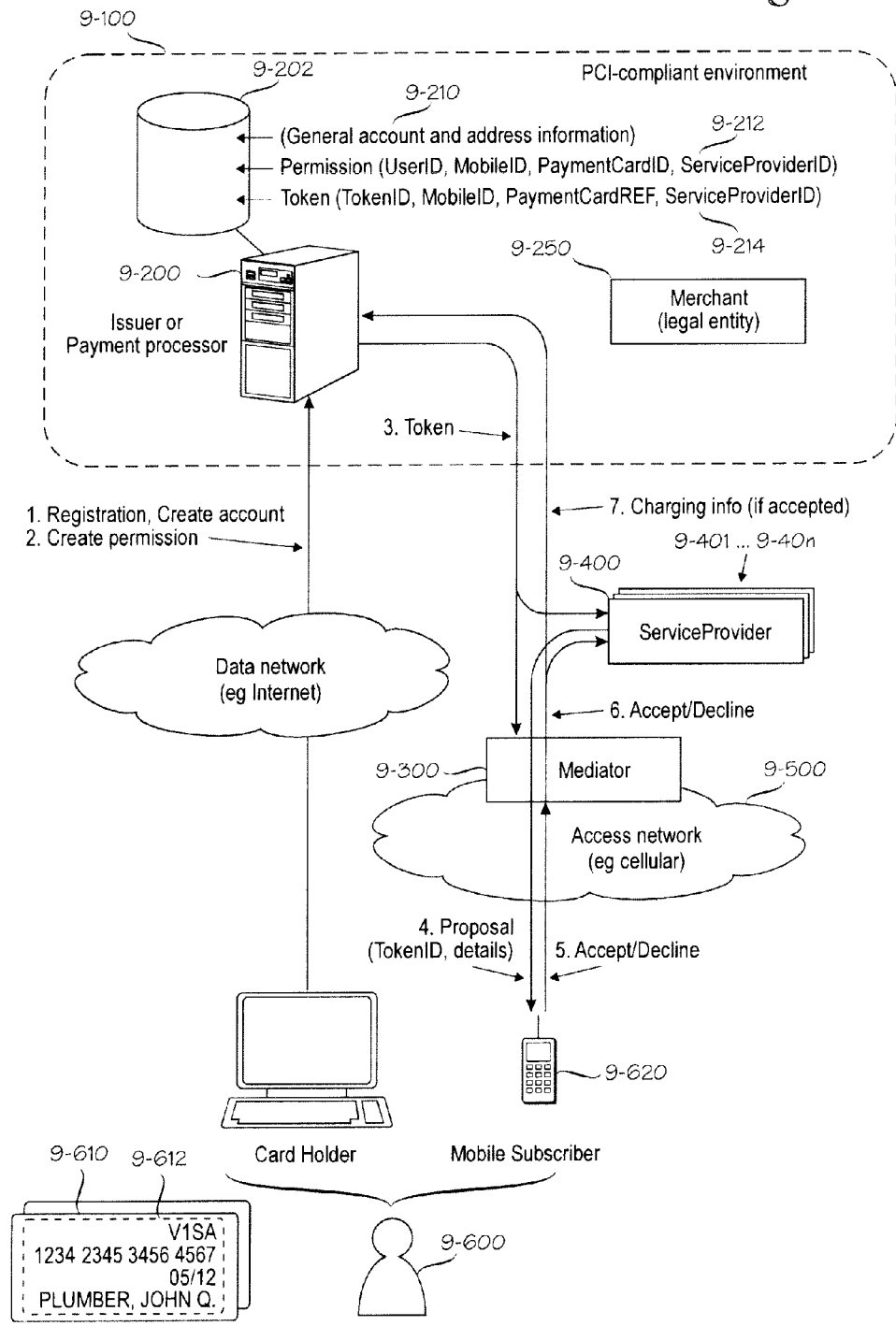

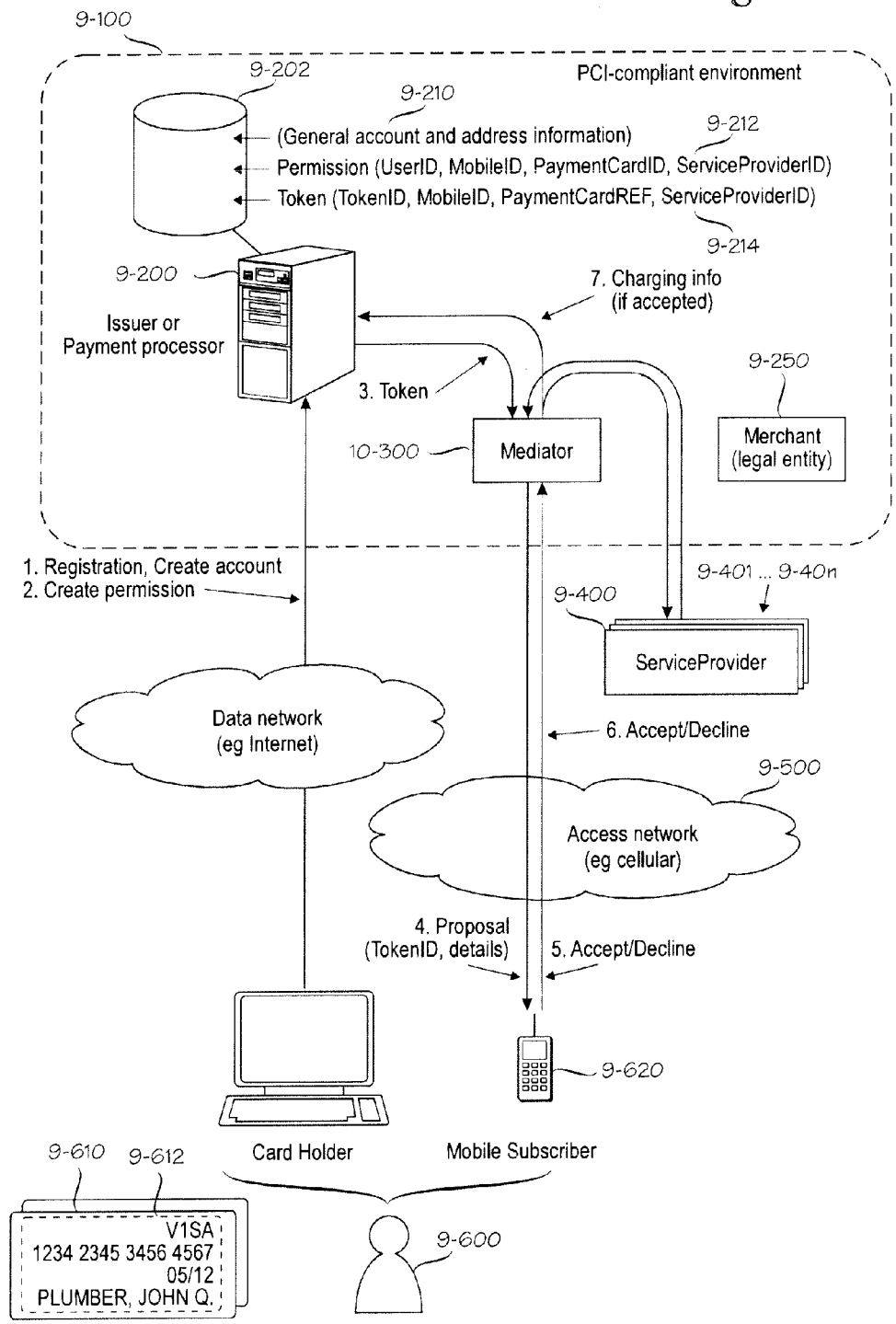

MANAGING RECURRING PAYMENTS FROM MOBILE TERMINALS

PARENT CASE INFORMATION

The present invention claims benefit from the following commonly owned earlier applications: 1) Ser. No. 12/944,749, title "Communication Method and System", filed Nov. 12, 2010, claiming priority from FI 20011680, filed Aug. 21, 2001; 2) Ser. No. 13/002,512, title "Method and System for Sending Messages", filed Jul. 3, 2009, claiming priority from FI 20085701, filed Jul. 4, 2008; 3) Ser. No. 13/074,037, title "Authentication Method and System", filed Mar. 29, 2011, claiming priority from FI 20011680, filed Aug. 21, 2001; 4) Ser. No. 13/039,338, title "Method and System for the Mass Sending of Messages", filed Mar. 3, 2011, claiming priority from FI 20051245, filed Dec. 2, 2005; 5) Ser. No. 12/972,610, title "Booking Method and System", filed Dec. 20, 2010, claiming priority from FI 20011680, filed Aug. 21, 2001; 6) Ser. No. 12/958,870, title "Communication Method and System", filed Dec. 2, 2010, claiming priority from FI 20011680, filed Aug. 21, 2001; 7) Ser. No. 12/401,392, title "Method and System for Delivery of Goods", filed Mar. 10, 2009; 8) Ser. No. 12/226,878, title "Method and System for Combining Text and Voice Messages in a Communications Dialogue", filed Apr. 26, 2007, claiming priority from FI 20060419, filed May 2, 2006; 9) Ser. No. 12/226,876, title "Method and System for Combining Text and Voice Messages in a Communications Dialogue", filed Apr. 26, 2007, claiming priority from FI 20060420, filed May 2, 2006; 10) Ser. No. 13/332,409, title "Financial Fraud Prevention Method and System", filed 21 Dec. 2011; 11) Ser. No. 13/452,229, title "Registration of recurring payment", filed Apr. 20, 2012; and 12) Ser. No. 13/452,311, title "One recurring payment invoking another", filed Apr. 20, 2012. The entire contents of the above-identified parent applications is incorporated herein by reference.

FIELD OF THE INVENTION

The present invention relates to telecommunications. In particular, the invention relates to methods and systems for authentication and/or verification via telecommunications.

BACKGROUND OF THE INVENTION

Services that are booked or used via the Internet are constantly increasing. The Internet enables one to use several on-line services such as services connected to banks, health services, travel agencies, vehicle maintenance, and so on.

The increasing popularity of mobile computing and communications devices introduce new challenges to services on the Internet. Mobile terminals are able to deliver information to users when needed and where needed. Users want ubiquitous access to information and applications from the device at hand. They also want to access and update this information wherever they happen to be.

It is important to notice, however, that not all the terminals will be mobile. Future services must be able to communicate with a large variety of terminal devices, both those that are mobile and those that are not. Different terminal devices have very different capabilities.

Interoperability of different services and terminal devices requires standards on several levels. It is not enough to have, say, common communication protocols. It would be very important to share common concepts and understanding what a certain piece of data means in a certain context. However, it has been very difficult to agree on those issues, as there exists an enormous number of companies, organizations, and other actors in the field.

Many services must be able to manage bookings. They include for example booking appointments for health services; booking travel reservations for hotels, airlines, and rental cars; booking tickets for venues; booking appointments for vehicle maintenance; booking maintenance for apartments; and so on. It would be very useful, if those services could get information from one another. For example, if a customer is booking tickets for a concert, he or she might want to book a table in a restaurant also. It helps, if the restaurant's booking service gets basic information, like date and customer's name from the theater's booking system. Unfortunately, there have not been methods to exchange information between different kinds of booking systems.

Additionally, such services as well as other services/companies such as banks and credit card companies have long had the problem of verifying that the user attempting to make a reservation, booking or purchase is the actual user that they claim to be. Similarly, customers would like to know that the information that they are providing to these services/companies is going to the actual company and that their information is secure. With identity fraud resulting from submitting personal information over the internet being a concern for many web users there exists the need for a safer authentication alternative than currently exists.

Companies and organizations, such as software developers and pharmaceutical companies, have for a long time dealt with the problem of piracy. Not only are such entities harmed by lost sales from counterfeit goods but consumers who unknowingly purchase counterfeit goods can be harmed by, for example, malware installed by hacked software or poor quality and mislabeled counterfeit drugs. Currently, such companies are trying to develop methods in which the authenticity of their products can be easily determined by their customers either prior to purchase or prior to use.

For services such as booking or calendar functions, information exchange often takes place as synchronizing booking or calendar entries. For that purpose, several important standardization efforts are going on. For example, SyncML is an industry initiative to develop and promote a single, common data synchronization protocol.

vCalendar is an exchange format for personal scheduling information. It is applicable to a wide variety of calendaring and scheduling products and is useful in exchanging information across a broad range of transport methods. A number of vendors have adopted the specification because it allows their products to exchange calendaring and scheduling information. vCalendar is an open specification based on industry standards such as the x/Open and XAPIA Calendaring and Scheduling API (CSA), the ISO 8601 international date and time standard and the related MIME email standards. The vCalendar format utilizes data normally stored within a calendaring and scheduling application, facilitating the cross platform exchange of information about items such as events and to-do's. An event is a calendaring and scheduling entity that represents a designated amount of time on a calendar. A to-do is a calendaring and scheduling entity that represents an action item or assignment. For instance, it may be an item of work assigned to an individual.

vCard automates the exchange of personal information typically found on a traditional business card. vCard is used in applications such as Internet mail, voice mail, Web browsers, telephony applications, call centers, video conferencing, PIMs (Personal Information Managers), PDAs (Personal Data Assistants), pagers, fax, office equipment, and smart cards. In addition to text, vCard information may include elements like pictures, company logos, live Web addresses, and so on.

A common problem with all of these existing solutions is that they do not provide common semantics for different systems and the transfer of information may not always be as secure, or at least perceived as secure by customers, as many customers wish. Another problem is that booking systems have multiple different and usually quite complex user interfaces. If a customer wants to both make an appointment with a dentist and book a taxi to take him or her there, the customer needs to enter all the booking information to both booking systems in different ways. While the dentist may have in place a secure method of making reservations, authenticating the client who makes the reservation and receiving payment for a booking, the taxi company may not.

Additionally, it becomes challenging to manage client replies for instance when a client has been given a number of questions. For example, it makes sense to use SMS text messages to ask a client which option he or she chooses, because in many countries, like in Finland, it is very common to communicate with SMS text messages and they create revenues to operators. However, if a client replies to several inquiries by sending a number of text messages, it can be troublesome to find out, which answer corresponds to a certain question because the reply does not automatically include a reference to the question. Say, a service asks a client if they want to reserve, in addition to a flight ticket, also a taxi and a hotel room, and the client replies "yes" to one question but "no" to the other, the service does not necessarily know which offer the client has accepted.

Other problems, such as clients not showing up for appointments, not using a service more than once or long intervals between use of a service can be addressed through the use of new systems and methods.

Accordingly, attempts to execute financial transactions wherein clients utilize mobile terminals without additional proprietary software are handicapped by limitations of current mobile communication protocols, such as the short message service (SMS). Notably, the SMS protocol provides no standardized manner for authenticating mobile users or managing sessions. Lack of standardized authentication techniques leaves systems vulnerable to fraud, while lack of standardized session management makes it difficult for service providers to keep track of which of the clients' responses correspond to which questions from the service provider. On the other hand, session management, fraud prevention and introduction of new services should not be overly complex.

SUMMARY OF THE INVENTION

It is an object of the present invention to alleviate one or more of the problems identified above. Specifically, it is an object of the present invention to provide methods and equipment that provide improvements with regard to one or more of session management, fraud prevention and smooth introduction of services.

Embodiments of the invention can be utilized in a system that comprises or supports one or more payment processor computers, one or more service provider computers and one or more mediator servers. At least one of each computer or server coordinate to provide servers to user that is a holder of one or more payment cards. Some embodiments relate to the payment processor computer, other embodiments relate to the mediator server, while yet further embodiments relate to the server provider computers. It should be noted that while the user is a holder of one or more payment cards, effecting payment does not always require use or even possession of a physical card and mere information suffices in some cases, such as in online shopping. While this is convenient for honest uses, it opens possibilities for fraud.

For instance, one specific embodiment can be implemented as a method for a payment processor computer configured to manage transactions related to one or more services provided by one or more service providers and payable by one or more payment cards. The method comprises performing the following acts at the payment processor:

receiving a first request to authorize recurring payments payable by a specific one of the one or more payment cards, the first request globally identifying the specific payment card;

creating a token that identifies a specific one of the one or more service providers, wherein the token fails to globally identify the specific payment card but identifies the specific payment card within payment cards issued to a holder of the specific payment card;

sending the created token to a first mediator server;

receiving from a second mediator server an acceptance notification indicating that the holder of the specific payment card has used a mobile terminal via a mobile network to authorize recurring payments to the specific service provider, wherein the first mediator server and the second mediator server may be the same mediator server or different mediator servers.

In another aspect, the invention can be implemented as a payment processor computer configured to perform the acts specified above. For instance, the payment processor computer may be implemented as a server computer configured to communicate with the mediator server over a telecommunication network. The payment processor computer comprises a memory and one or more processing units. The memory stores program instructions whose execution in the one or more processing units causes execution of the acts specified in connection with the method. For high-volume implementations, the payment processor computer may comprise multiple processing units and load-balancing unit for distributing processing load among the multiple processing units.

In some implementations the payment processor computer complies with specifications issued by Payment Card Industry ("PCI") Security Standards Council, while the mediator server operates outside said specifications. This implementation facilitates introduction of new services because transactions relating to the new services can be managed by the mediator server which does not have to comply with the PCI specifications.

For instance, the payment processor computer and mediator server may provide joint authentication of the holder of the payment cards. In one implementation, the holder of the payment cards is authenticated by the payment processor computer using a first terminal and a first set of authentication information. The holder of the payment cards indicates a second terminal also operated by the holder of the payment cards, and the user of the second terminal is authenticated by using the second terminal and a second set of authentication information. The first request is received from a first terminal and indicates a second terminal, wherein the first terminal and second terminal may share a common physical device or reside in separate physical devices but the first terminal and second terminal use different authentication information. In an illustrative but non-limiting example, the first terminal is authenticated by using one or more of: a combination of user identifier and password; a programmed microchip and a PIN code, while the second terminal may be authenticated by using a non-predictable reply address for sending a notification to the second terminal. If the user of the second terminal has been able to respond to the notification, this means that the second terminal has received the notification from the mediator server. Otherwise the second terminal or its user could not know the non-predictable reply address. In view of the fact that the notification is sent to the second terminal which is identified in the first request from the first terminal, any fraudulent action is only possible if both the authentication information used from the first terminal and the second terminal are stolen before the theft is detected and the payment cards are suspended.

To facilitate use of services from a plurality of service providers offering related services, the method of the payment processor computer may further comprise the following acts at the payment processor computer:

receiving a second request to authorize second recurring payments to the second service provider, the second recurring payments payable by a second payment card of the one or more payment cards, wherein an association exists between services of the first service provider and services of the second service provider, and wherein the first and second payment cards may be the same payment card or separate payment cards;

in response to the second request, using a mediator server to obtain confirmation from the holder of the payment cards that the second service provider may propose services to the holder of the payment cards;

creating a token that identifies the second service provider, wherein the token fails to globally identify the second payment card but identifies the second payment card within payment cards issued to a holder of the payment cards;

sending the created token to a mediator server;

receiving from the mediator server an acceptance notification indicating that the holder of the specific payment card has used a mobile terminal via a mobile network to authorize the second recurring payments to the second service provider.

Another specific embodiment is a method for a mediator server configured to manage transactions, which relate to one or more services provided by one or more service providers and are payable by one or more payment cards. The method comprises performing the following acts at the mediator server:

receiving, from a payment processor computer, a token that identifies a specific one of the one or more service providers, wherein the token fails to globally identify the specific payment card but identifies the specific payment card within payment cards issued to a holder of the specific payment card;

receiving, from the specific service provider, a proposal for a service that incurs recurring payments payable by one or more payment cards;

sending a notification to a mobile terminal operated by the holder of the specific payment card, wherein the notification identifies the proposal for the service that incurs recurring payments, wherein the notification further identifies the specific payment card within payment cards issued to the holder of the specific payment card;

receiving, from the mobile terminal operated by the holder of the specific payment card, an acceptance notification indicating that the holder of the specific payment card has used the mobile terminal via a mobile network to authorize recurring payments to the specific service provider;

notifying the service provider and the payment processor computer of the acceptance notification.

In another aspect, the invention can be implemented as a mediator server configured to perform the acts specified above.

A still further embodiment can be implemented as a method comprising performing following acts at a service provider computer:

receiving information indicating that a holder of a specific payment card may authorize recurring payments for one or more services provided by a service provider in charge of the service provider computer;

sending, to a mediator server, a proposal for a service that incurs recurring payments payable by the specific payment card;

receiving from the mediator server an acceptance notification indicating that the holder of the specific payment card has used a mobile terminal via a mobile network to authorize recurring payments to the specific service provider.

In another aspect, the invention can be implemented as a service provider computer configured to perform the acts specified above.

BRIEF DESCRIPTION OF THE DRAWINGS

In the following section, specific embodiments of the invention will be described in greater detail in connection with illustrative but non-restrictive examples. A reference is made to the following drawings:

FIG. 9A is a block diagram of a system configured to authorize payments from mobile terminals;

FIGS. 10A to 10D illustrates further variations for the embodiments described in connection with FIGS. 9A-9C.

DETAILED DESCRIPTION OF SOME SPECIFIC EMBODIMENTS

Figure 1:
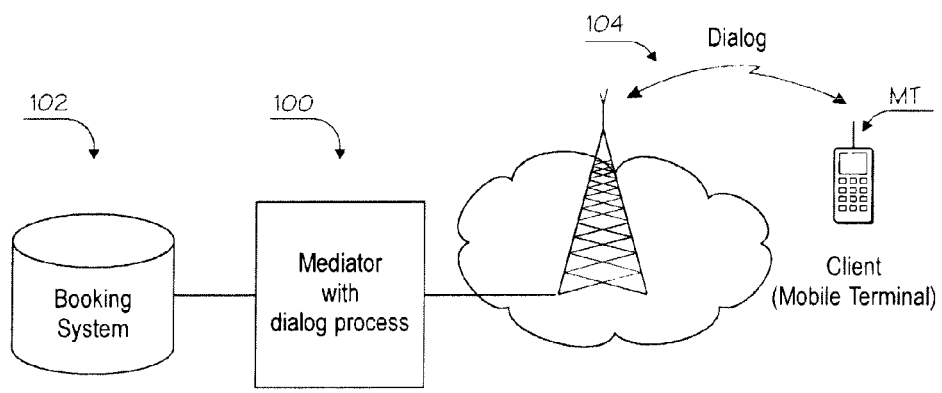
FIG. 1 shows a mediator that mediates services between a service provider and a representative mobile terminal, wherein the service being provided is a booking service.

This detailed section begins with a description of session management and authentication, with reference to FIGS. 1 through 8. It will be appreciated that the techniques for session management and authentication, as described in connection with FIGS. 1 through 8, are applicable to a wide range of services. For instance, FIGS. 9A through 9C and 10A through 10D relate to provisioning of services in a system wherein payments are processed by a payment processor that needs to comply with a strict set of certification requirements. FIG. 11 relates to an exemplary hardware description for the various servers and mediators.

The techniques disclosed herein can be used to provide a wide range of financial services and transactions, including but not limited to: booking of a primary service; booking of a related service that relates to the primary service; executing payment for the primary and/or related services. An illustrative but non-exhaustive list of services includes transportation, accommodation, nutrition, entertainment, services relating to health or appearances, consultation or other services. From the point of view of the technical problems to be solved, namely session management, authentication, fraud prevention and/or ease of service provisioning, no distinction needs to be made between services and physical objects. In other words, acquirement (eg purchase, loan, lease) of an object is an example of a service requested by a mobile user and offered by a service provider.

The service providers are those with whom clients want to make appointments, reservations, or other bookings and comprise the resources for the booking system to allocate. Service providers conduct business through service provider booking services. As used in this application, the mediator is a network based service available to the service provider booking services over the network that provides additional semantics, translation and synchronization services needed for communication of the information needed for a client to complete a transaction with a service provider. The service provider booking services and the mediator are preferably applications operating on network servers such as the Internet or a private intranet. In general, a system will comprise a plurality of service providers and service provider booking systems (implementing service provider booking services), but it is possible to have a simple booking system for only one service provider in which case the mediator and service provider could be tightly integrated into a single application.

Clients preferably include clients communicating on mobile telephones capable of receiving short text messages, such as Short Message Service (SMS) messages.

Of course, a system that is capable of handling SMS messages will also handle other clients with greater capabilities. In some implementations the mediator may communicate with mobile telephone clients through an SMS gateway. As is well known, SMS gateways are operated by mobile network operators. The mediator communicates with clients using dialogs. In some implementations, the dialogs are short messages which present information to the client and allow a simple reply. The dialogs preferably provide users with simple choices, such as a selection between "yes" and "no", or a simple selection from an ordered list. Dialogs can also be one way, such as an acknowledgment to a reservation. A transaction may typically involve a sequence of dialogs each involving a simple response. Dialogs involve asynchronous communication by messages. The system as described makes it possible to coordinate bookings among different service provider systems in order to fill a clients need, for example coordination of an airline booking with transportation to the airport.

Figure 2:
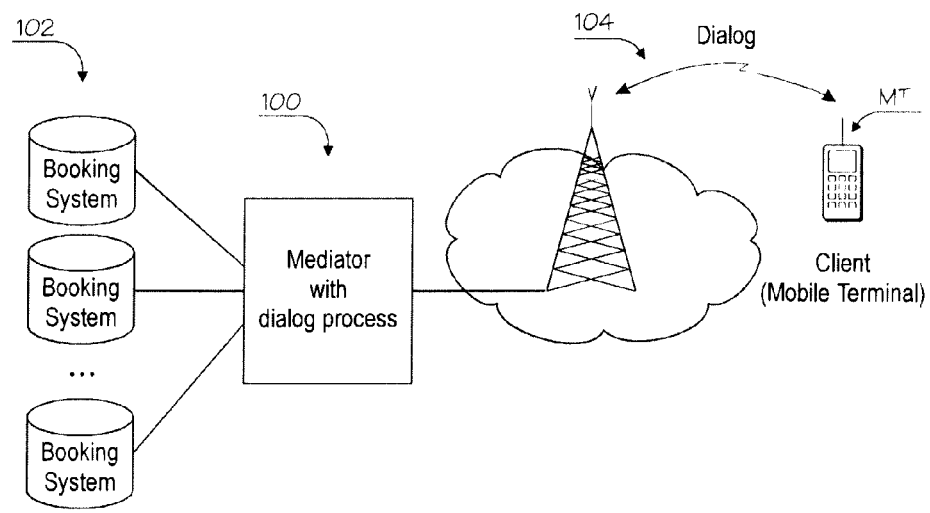
FIG. 2 shows a version of the mediator that is capable of serving multiple service providers.
Figure 3:
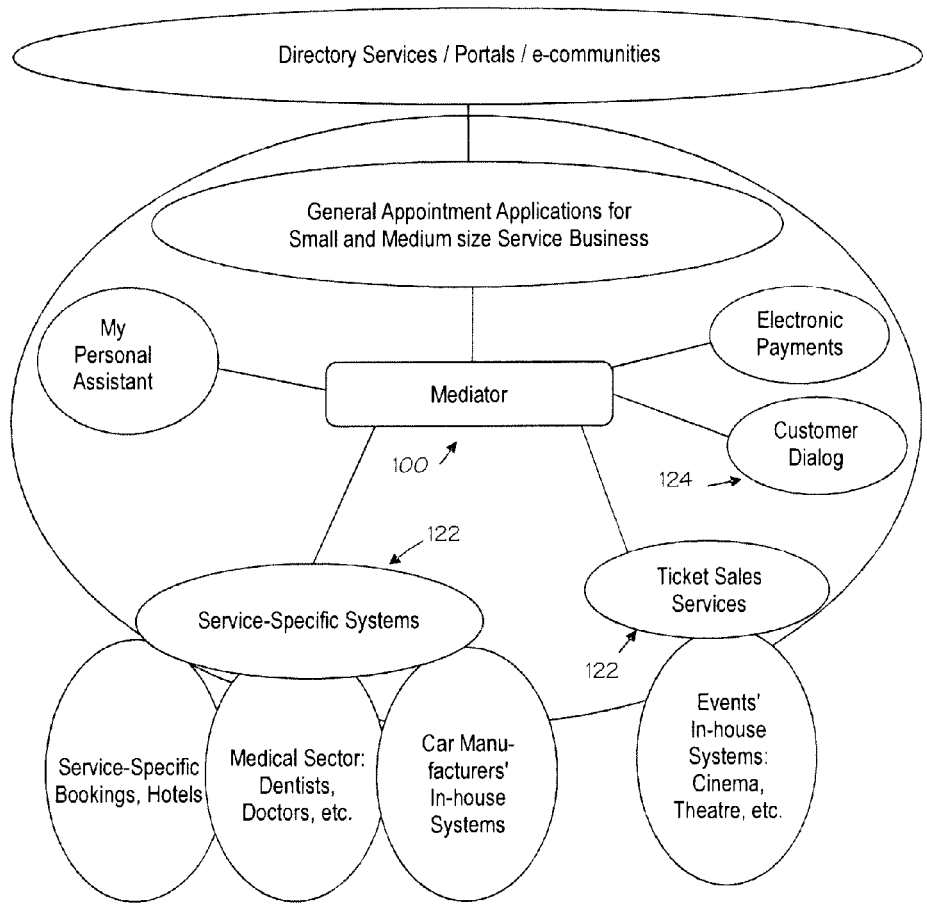
FIG. 3 represents a more detailed view of the system shown in FIG. 2.

FIG. 1 is a diagram of a simple system, wherein reference numeral 100 denotes a mediator, reference numeral 102 denotes a service provider's booking system, which is in communication connection with the mediator 100 over a data network, such as the internet. Reference numeral 104 denotes a user terminal having a dialog with the mediator 100 over a mobile network. FIG. 2 shows a plurality of service provider booking systems communicating with a mediator over a network. FIG. 3 shows a mediator 100 communicating with various service provider systems and users with telephone devices communicating dialogs.

A reason-based customer dialog is a desirable improvement from the client's point of view, because service providers can create their own dialogs for with each different kind of booking event. A dialog is closely related to a certain booking situation. A dialog may become activated automatically at the right moment, or the client can activate the dialog as needed, or another entity in the system can send a message to the dialog process of the mediator to activate the dialog. The dialog process then sends an inquiry to another entity in the system or informs the client and possibly inquires client's choices. By means of this kind of dialog, the client can make reservations in several booking systems using only one user interface. The dialog process connects to remote booking systems over an appropriate data network, such as the Internet or mobile networks.

A mediator service can be capable of transmitting booking information between service provider booking systems. For example, after a booking is entered into an airline booking system, a taxi booking system can offer the client a lift to the airport. In this application, a booking is an allocation of a single resource (either the airline booking or the taxi in the previous example), while a reservation is the union of the bookings for all of the resources for the same event (the airline booking plus the taxi booking in the previous example). The dialog between the client, the mediator and the booking systems as well as stored customer profiles ensure that the client gets the reason-based service he or she needs, not intrusive advertising.

A client can make reservations as well as confirm, change, and cancel them using many kinds of communication means, including but not limited to the Internet, e-mail, and mobile terminals. The client can also synchronize a calendar provided by the mediator or a service provider with a calendar in a terminal device using mediator's synchronization functions.

A service provider can remind clients to make reservations on a regular basis and thus increase customer loyalty. A mediator can help service providers to bring their booking systems together to provide more comprehensive services without extending their businesses unnecessarily. Because of internationalization, the mediator is able to support for example many languages, time zones, currencies, and data formats.

The system, including at least a mediator, a dialog process, a service provider, and a service provider booking system, can be on one of the following levels:

1. There is a predetermined set of dialogs in the system. Their content and the possible choices are set in advance. For example, if a client books a flight, a dialog always offers certain other bookings. Client's prior actions are not taken into consideration.
2. There is an unlimited number of dynamic or "intelligent" dialogs that are based on, for instance, a profile that a client has created himself or herself, usage history records, and client's location. Simple logic supports decisions. It is a low-level expert system.
3. The system is able to make decisions by itself and to support client's decision making. On this level, a dialog process may include a high-level expert system. It can act as an agent and negotiate with several service providers to get the best offer without client's direct involvement.

In one exemplary use case, a client books a service from a service provider. The booking may be carried out using a terminal that is connected to the mediator service. First, the client connects to the mediator service using a dialog. The client inputs a reservation inquiry to the dialog process that sends the inquiry to the mediator. The mediator inquires possible reservations from the service provider's information system using concepts and terminology that those services are able to interpret. The inquiry is based on client's preferences. The client discloses some preferences that are related to the specific booking when they enter the reservation inquiry to the dialog. In addition, the dialog process and the mediator service may have stored a client's general preferences and use them so that the client do not need to input all the preferences each time.

In some implementations, management of the inquiry and booking processes may be based on sophisticated state models. Each booking process involves several phases that are described by states that track its status through its life cycle. For example, when the mediator has inquired about a reservation from a service provider, the corresponding entry in each system has a state that the booking is pending but not confirmed. If the systems do not have common understanding what a certain state means, the mediator translates them. A preferred booking process including the phases and states is described in Example 1.

In addition to inquiring reservations from the service provider, the mediator is able to synchronize bookings in several service providers' systems. The synchronization is based on rules specified in the mediator service. For example, a rule can be that "if a client inquires booking for an airline ticket, inquire also bookings for taxis to the airport." Therefore, an inquiry from the client may be multiplied in the mediator service resulting a number of inquiries. The service providers answer to the mediator if they are able to provide requested service and they may add some additional information, like on seats or timing. The mediator combines gathered information and sends it to the dialog process that shows a simple list of options to the client. For example, the dialog process may show three options for a flight and ask if the client also wants to reserve a taxi that is actually already tentatively booked by the mediator. The client makes his or her decision by choosing the options from the simple list of alternatives. The dialog process sends information on the client's choice to the mediator that confirms the bookings in accordance with client's choices and cancels the unnecessary reservations.

Figure 4:
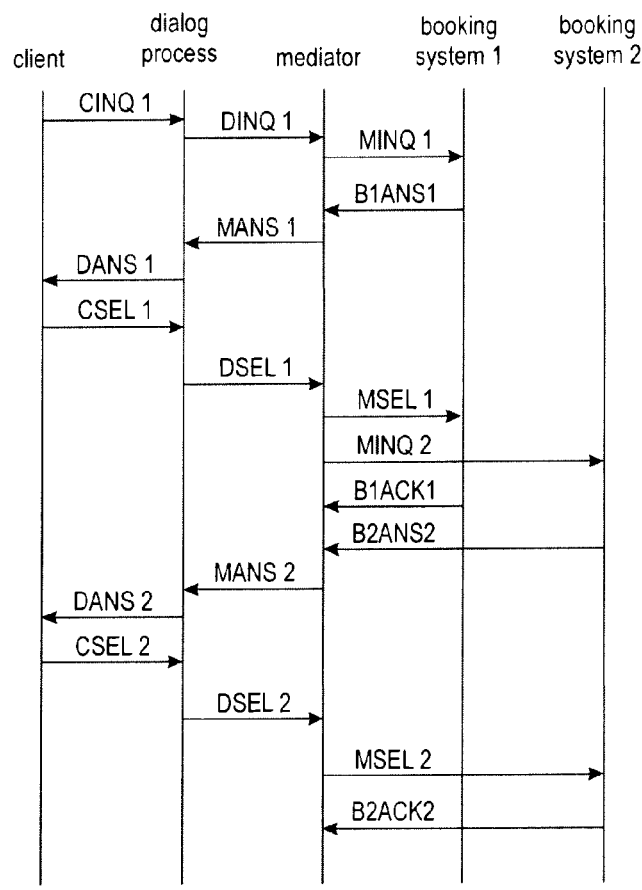
FIGS. 4 and 5 are signaling diagrams depicting typical use cases in a system as shown in FIGS. 1 through 3.

FIG. 4 shows a sequence diagram of an inquiry CINQ1 originated by a client using a dialog DINQ1 sent to the mediator. The mediator initiates the inquiry MINQ1 which corresponds to CINQ1 and DINQ1 to booking system 1 a service provider booking system. Ultimately an answer DANS1 gets back to the client offering a choice which is responded to with a selection CSEL1 resulting in a booking by the client on booking system 1. The mediator recognizes the potential need for a complementary service from booking service 2 and initiates an inquiry, MINQ2, to booking system 2, which ultimately results in a proposal including several choices, DANS2, returned to the client from which a selection, CSEL2, is made, resulting in a complementary booking on booking system 2.

The bookings can be done in other means as well, for instance, by calling the service provider with a telephone or by visiting on site the service provider's office. In that case the service provider may inform the mediator about client's bookings so that the mediator can inform the client on other options. For example, a dentist could tell the mediator that the client has booked an appointment so that the mediator may offer to book a taxi also.

Figure 5:
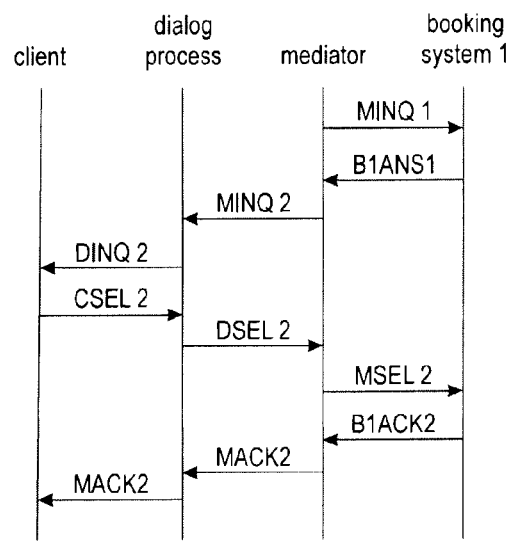

Also, it is possible to add a reminder to the mediator service so that the mediator asks at certain time if the client wants to make a new booking. For instance, the mediator can send a notice to the client that it has been a year since the client last had an appointment with his or her dentist and ask if the client wants to make a new appointment. This notice can already include a few options for the appointment. The mediator has checked the client's calendar if he or she has allowed that so that the given options are convenient for the client. The dialog shows the options in a simple and handy way. The client needs only to choose which option is the best for him or her or whether he or she wants to get new options or postpone the booking. FIG. 5 is a time sequence chart for a situation where the original inquiry, MINQ1, was initiated by the mediator.

Example 1

An Exemplary Booking System

Referring now to FIG. 3, an exemplary environment in which the invention can be utilized for management of bookings will be described below. In the implementation currently described, the mediator 100 is designed to interface with various service-specific systems generally denoted by reference numeral 122. These systems may be used to provide the services (including physical goods) described earlier. In a typical implementation, the mediator 100 interfaces to the service-specific systems 122 over a data network such as the Internet. The mediator 100 further interfaces to client terminals, such as mobile terminals capable of receiving text messages, over a mobile network. On a logical level, interfacing of the mediator 100 to the various service-specific systems 122 and other parties may be accomplished by means of generic XML definitions. For the exemplary case of managing of booking reservations, the mediator 100 may support vCard and vCalendar standards, since they are used by many major booking and calendar systems.

In the presently-described implementation, the mediator 100 communicates with the mobile terminals and their users using Short Message Service (SMS) via an SMS Gateway for asynchronous communication. The mediator 100 may comprise a customer dialog process 124 configured to use Dynamic Dialog Matrix (DDM) technique, which may be used to facilitate authentication and/or session management, as will be described in more detail in connection with FIGS. 4 through 8.

A clear distinction needs to be made between the booking processes of the ultimate service providers and those of the mediator. The booking processes of the ultimate service providers only cover normal booking with regard to time and resource reservation. The booking processes of the mediator comprise booking, work, and financing. Both processes lead to the same point. In a typical implementation, the process of the mediator comprises seven phases as follows:

Phases (Status Handling)

The phases set up a coupling (analogous with a bond or rubber band) between the resources. In each phase of the mediator process, data related to the booking will be amended to reflect the needs of the phase in question. For the statuses and values please see the underneath table. The phases are described in more detail in the following discussion.

1. Filing

Filing means initialization of a mediator process and a booking process. As a result of the initialization an entry is inserted in the database with basic information. It will not appear in a calendar since there is no scheduling information. It can be displayed in a separate task list of the owner as an open task.

2. Requesting

In the Requesting phase a booking request is sent to the resources required for the previously filed task. Since there is no scheduling, which in most cases will be essential, this phase may be executed together with the Scheduling phase.

3. Scheduling

Schedule is given to the owner and the resources. As a part and a result of the Scheduling the following data is needed:
a) suggested start-time (ISO time-stamp w/time zone)
b) suggested start-location (coordinates)
c) suggested end-time (ISO time-stamp w/time zone)
d) suggested end-location (coordinates)

4. Confirming

Time and location as it is accepted by the resources that have accepted. Data related to this phase:
a) accepted start-time (ISO time-stamp w/time zone)
b) accepted start-location (coordinates)
c) accepted end-time (ISO time-stamp w/time zone)
d) accepted end-location (coordinates)

By default the data is copied from the Requesting and/or Scheduling phases. In practice, if planned time is not needed, the same data structures can be used for this and status indicates the actual meaning of the data.

5. Working

The resources perform the booked task. Data related to this phase consists of different attributes and their values, which are related to the actual task. In addition, following static structures are needed:
a) actual start-time (ISO time-stamp w/time zone)
b) actual start-location (coordinates)
c) actual end-time (ISO time-stamp w/time zone)
d) actual end-location (coordinates)
e) products used, extras, mileage, . . . .

By default the data is copied from the Confirming phase.

6. Accounting

At this point all data stored in the data structures on previous phases is analyzed and processed for invoicing purposes. Data related to this phase: Accounting data. To be defined separately.

7. Completing

The task has been completed. As regards the mediator processes, it is irrelevant whether the task succeeds or not. Success or failure of the task is relevant to the Accounting phase, in which the financial actions to the organizer are handled. In this phase, housekeeping (database contents; temporary files, etc.) is performed in order to complete the mediator process. The following table shows data available in each phase. Booking phase is with "XX".

| Phase | Status | Next Phase | vEvent | vTodo |
|---|---|---|---|---|
| Filing | | Requesting | | |
| Requesting | | Scheduling | Sent | Sent |
| Scheduling | Pending | Confirming | Needs Action | Needs Action |
| Scheduling | Scheduled | Confirming | Needs Action | Needs Action |
| Scheduling | Re-scheduled | Confirming | Needs Action | Needs Action |
| Confirming | Accepted | Working | Confirmed | Accepted |
| Confirming | Declined | Accounting | Declined | Declined |
| Confirming | Tentative | Accounting | Tentative | |
| Confirming | Delegated | Requesting | Delegated | Delegated |
| Confirming | Re-scheduling requested | Accounting or Scheduling | | |
| Confirming | InProgress | Working | | |
| Working | InProgress | Working | | |
| Working | Delayed | Working | | |
| Working | Started | Working | | |
| Working | n % ready | Working | | |
| Working | Ready | Accounting | | |
| Accounting | | Completing | | |
| Completing | <Copied from phase before Accounting> | n/a | | |

Internal phases Paused, Re-started, and Canceled act as follows for all relevant phases at any point:

| <Phase y> | Paused | <Status x> |
|---|---|---|
| <Phase y> | Re-started | <Status x> |
| <Phase y> | Cancelled | Accounting |

Figure 7:
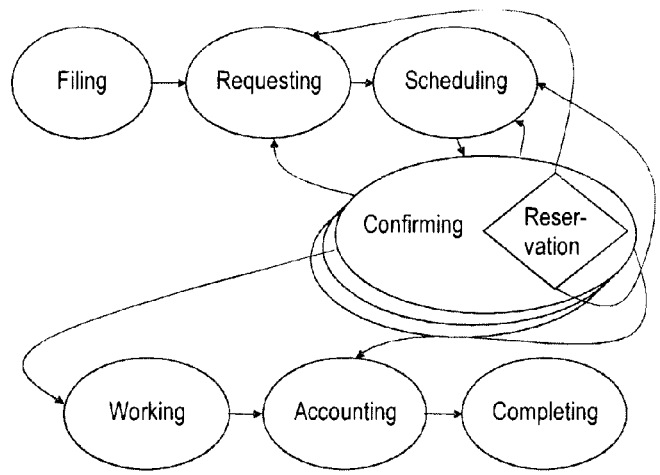
FIG. 7 shows detailed phases of the booking process which is an example of a service offered by a service provider.
Figure 8:
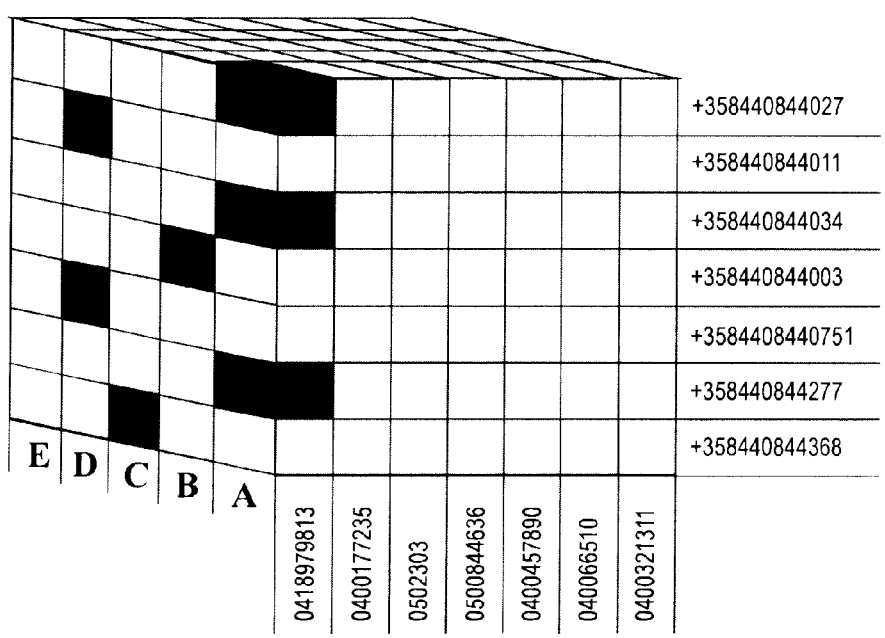
FIG. 8 shows an illustrative example of a dynamic dialog matrix.

FIG. 7 shows the work flow transitions from phase to phase. For conditions, see the table above. Also, please note that Canceled Status always leads to accounting.

Confirming the (Whole) Reservation

In order for the whole Reservation to be successful, all resources, which accepted the reservation, need to have the same scheduling. In addition, there will resources in different roles and data related to the working phase may vary greatly. The different statuses of the whole reservation are:
a) "NoReplies" (0) for "No-one hasn't replied to the request made by the organizer"
b) "NoDeclines" (1) for "Not all invitees have replied yet. The ones who have replied have accepted"
c) "AllAccepts" (2) for "all invitees have confirmed"

| Filing | X | | | | | | XX | |
|---|---|---|---|---|---|---|---|---|
| Requesting | X | X | | | | | XX | |
| Scheduling | X | X | X | | | | XX | |
| Confirming | X | X | X | X | | | XX | |
| Working | X | X | X | X | X | | XX | |
| Accounting | X | X | X | X | X | X | | |
| Completing | X | X | X | X | X | X | | X |
| Phase/Data | Identifying | Resources | Suggested time | Accepted time | Task's work related | Accounting | | Closing |

Phase Statuses, Values, and Transitions

The following table describes the phases, their statuses, and values along with transition to next logical phase based on the values gotten. In addition, corresponding vCalendar statuses are shown when applicable.

d) "SomeDeclines" (3) for "Some of the invitees have declined"
e) "AllDeclines" (4) for "All of the invitees have declined".

The following decision table helps in evaluating the status of the whole booking. "Maybe" means that this condition only does not incontestably specify true or false result.

| Booking Status/Confirmations | No one answered | No one accepted | Some accepted | All accepted | No one declined | Some declined | All declined |
|---|---|---|---|---|---|---|---|
| NoReplies | True | Maybe | | | Maybe | | |
| NoDeclines | True | Maybe | Maybe | True | True | | |
| NoAccepts | True | True | | | Maybe | Maybe | True |
| AllAccepts | | | True | True | Maybe | | |
| SomeAccepts | | | True | Maybe | Maybe | Maybe | |
| AllDeclines | | Maybe | | | | | True |
| SomeDeclines | | Maybe | Maybe | | | True | Maybe |

Based on the information and decision table above the organizer/application has to make the decision of what to do with the reservation. That can be an automatic decision made by the system based on pre-set rules or made by the organizer manually.

Figure 6:
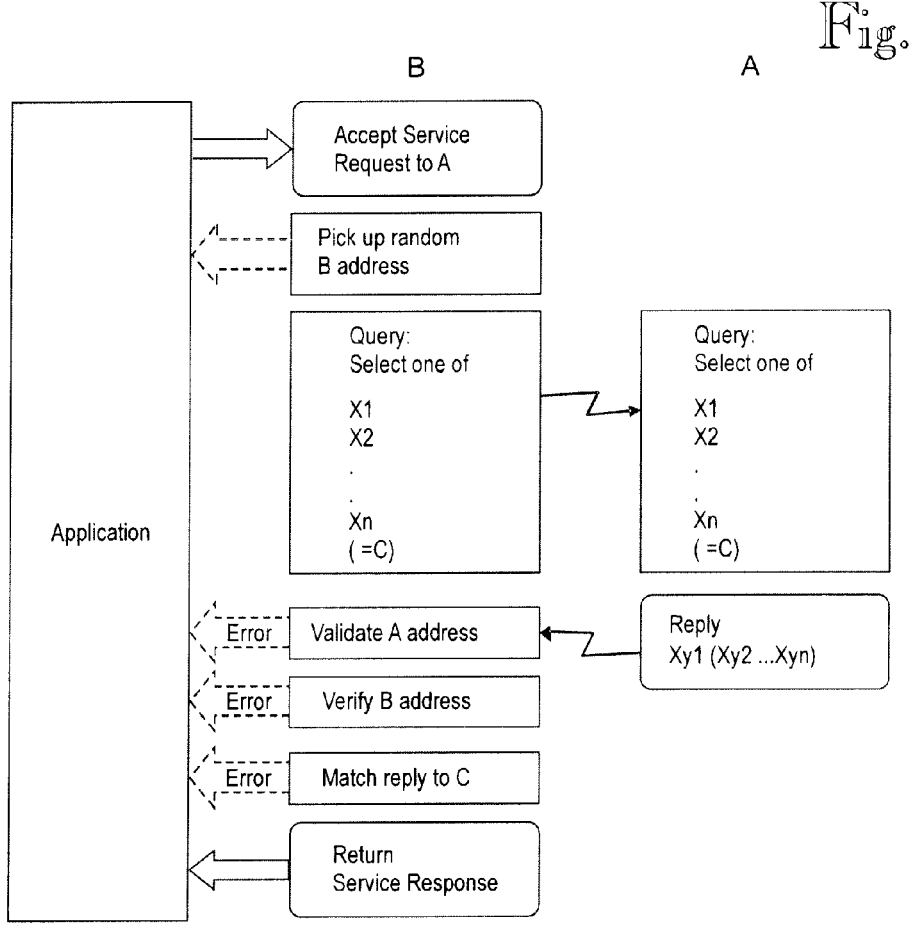
FIG. 6 shows an example of a dynamic dialog matrix being applied to a query and reply.

FIG. 6 shows an example of the dynamic dialog matrix applied to a query and reply. An application sends a service request to a user to a mediator B. The mediator B picks up random B address from a group of available B addresses wherein it can receive responses from the user. After defining the B address, the mediator B sends a query to user A, wherein the query may consist of a list of choices from which the user A may select the reply. The user A receives the query in their terminal and sends a reply to that query to the B address. The mediator B receives the user's reply in the B address. After receiving the reply from the user A, the mediator B processes the reply. First the mediator B validates the A address (which is the user's address). In case the A address does not correspond to the A address whereto the message was sent, the mediator B may inform the application that no response was received. In case the A address corresponds to the A address to which the mediator B has sent a query, the mediator B verifies the B address (the reply address into which the reply was received). Correspondingly, in case the B address is not a valid B address for the user, the mediator B may inform the application that no response was received. In case also the B address corresponds to the B address that the message was sent from, the mediator B matches the reply C to the list of available choices for that message. If the reply does not correspond to the available list of choices, the mediator B may send an error information to the application, or send a new query to the user A. If the reply corresponds to the available list of choices that was sent to the user, the mediator B sends a return service response to the application.

The system as described in connection with FIG. 6 may have a plurality of B subscriber addresses, such as telephone numbers, wherefrom the mediator B may select a subscriber number where the message to the user A is sent. Further, the user A preferably has a mobile telephone, having a mobile subscriber number, whereto the message is sent, and wherefrom the user A may respond to the query. The messages to and from the mediator B are sent over the telecommunication network.

A major problem solved by the dynamic dialog matrix is the challenge of managing client replies, when a client has been given a number of questions and the client is using SMS text messages or similar technology in which a reply does not automatically include an explicit reference to the inquiry. An inquiry always includes some kind of receiver's address or identification. In the SMS text message case that is so called B subscriber's number. On the other hand, sender's A subscriber's number or Calling Line Identity (CLI), or similar identification is also attached to each text message. Therefore the client or B subscriber is usually easily able to answer a message using mobile device's answer or reply function. If a mediator service that sends inquiries to a client, uses different A subscriber numbers in different inquires, it is possible to differentiate between answers based on which number the client is sending replies to. For example, if a mediator sends a client an inquiry "Do you also need a taxi?" using A subscriber number A1 and then inquiries "Do you need a hotel room?" from A subscriber number A2, client's reply to the first question goes to number A1 and the second answer goes to number A2. Using a dialog matrix, a mediator keeps track on inquires and answers. In the matrix, there is a column for each client and a row for each A subscriber number the mediator is using. Obviously, there could be a row for each client and correspondingly a column for each A subscriber number as well. After sending an inquiry from a certain A subscriber number to a client, the status and the reply is stored in the corresponding cell of the matrix. As a result, the mediator is able to find out whether the client has replied to a certain inquiry and what the answer was. Also, it is possible to use the matrix to collect information about clients' behavior and use it for example for marketing purposes. A mediator needs only a limited number of A subscriber numbers. A dialog matrix can also be used to find out which A subscriber numbers can be used when the next inquiry to a certain client is sent.

The use of the Dynamic Dialog Matrix as described above is illustrated in FIG. 7. The Dynamic Dialog Matrix is also a powerful but very simple security measure for authenticating a mobile phone user who has only the capability of sending and receiving messages. The problem is for a service to confirm a sender's identity. One way to try to identify the user is to check the sender's address. Normally SMS, e-mail, and other alike messages have the sender's address attached. That address can be for example the sender's A-subscriber's number or Calling Line Identity (CLI), or e-mail address or IP address. However, it is quite easy to falsify a sender address. From the service provider's perspective, the downlink from a service provider to a user is usually relatively reliable and it is hard for others to capture or change messages, but the uplink from a user to a service provider is much more vulnerable and it is not too difficult to give a wrong sender's address. A well-known solution to the above problem is to use encryption technologies to secure the communications, public-key infrastructures (PKI) being good examples. For instance, a user device can be equipped with a microchip, a secure SIM card in GSM devices for example, to encrypt messages using the user's private key. Then the service provider can be sure that the message is from the user, if it can be decrypted using the user's public key. However, this solution requires special devices that are not very common, inexpensive, or standardized so far. Relying on such a solution restricts the number of potential users significantly.

Using the DDM provides a novel solution. When the service sends a request to the mobile phone user, each request contains a different, preferably randomly chosen, reply number. Thus an acceptable answer is only the one that is sent to the correct reply address.

An example is for authenticating a user who is making a purchase, eg purchasing a software product "ABC". The user first initiates a purchase request to the company/service, eg directly in the software program, via an internet website or via a mobile device. The company/service then knows the user name and possible other identification information and sends a request to a credit card company to request a payment. The credit card company then sends a request to a mediator to authenticate the purchase. The mediator knows the user and the user's mobile number and sends a message, eg SMS or MMS, to the user's known phone number. An example of a message could be:

"Dear Mr. Client, your credit card was used to purchase product ABC on 27 Mar. 2010 for 299 euros. Please reply:
y—to accept the payment on VISA xxxx xxxx xxxx 123
n—to reject the payment or
f—to report a fraud on your credit card".

By responding to the message from the known user's mobile number with an acceptable response allows the mediator to respond to the credit card company if the user authorizes the purchase or not. Thereafter, the credit card company may authorize the payment and inform the company/service. Additionally, if the mediator sends the message from a randomly chosen reply number as discussed above, there is an added layer of authentication. Because it is possible for a fraudulent user to determine a credit card holder's mobile number and fake a message from said number, it would be extremely improbable for them to know which reply number the authentication message would originate from. The above may also be used, for example, with money transfers between a user's bank and the company/service.

An additional element of safety and security can be achieved using semantic analysis. For example, if the user is asked to tell how many items are ordered, and the answer is "y" or "yes", then apparently the user did not know what the question was and the message was not an answer for the enquiry.

Such a system can also provide a level of security for the user. The mediator can authenticate the company/service, by any acceptable method, and only send authentication messages once the company/service has been authenticated. Then, if the user does not provide their mobile number when providing their identification information, when they get an authentication message, even from a number they do not recognize, they will know that the mediator has authenticated the company/service.

While the present example has been explained in terms of the mediator sending the message, the message could be sent by a secondary entity at the request of the mediator. For example, when the mediator receives a request to authenticate a transaction, the mediator can then provide the user's bank with the necessary transaction details and request that the bank send the necessary authentication method. Another example would be if the mediator sends a request to the bank for some of the user's identity information, eg mobile number, so that it can proceed with sending the actual request itself or through a tertiary service provider which handles the actual message sending.

Additionally, though the present example has been described with the transaction being the purchase of a product and authentication of the user for payment, the same system and similar method can be used for other transactions, such as the authentication of the purchased product.

The use of a Dynamic Dialog Matrix (DDM) allows for authentication and verification of products, services and transactions based on a plurality of combinations of data. Based on as little as two pieces of information from the DDM an entity can be verified. Based on more pieces of information from the DDM, a higher degree of verification can be achieved.

A DDM which is being used for verification purposes can contain, or have access to, multiple of some or all of the following: reply addresses used for sending messages, reply addresses for which messages are received, user addresses, questions, acceptable answers for questions, order of receiving answers and verification information (eg product keys, ID codes). A key to the DDM is that it allows verification between a company/service and a user through a mediator (and possibly through another party) by matching information that each entity knows and the others should not know. Some examples are as follows:

If a user downloads a piece of software from the internet they want to know that the software is legitimate, ie, not pirated or hacked, while software developers want to make sure that users are paying to activate their programs. Therefore, prior to use the user is requested to enter a product key. The user sends a message, eg SMS, to a number with a product ID code. If the ID code is valid and has not been previously registered then the user receives a message with the product key. Therefore, the DDM matches the user entered product ID code with an indicator if it has been registered to verify if a product key should be issued. A similar process could work in conjunction with the payment process described above. Once the purchase of the software is authenticated as described above then an additional message can be sent to the user with the applicable product key. A similar method and system can be used to verify the legitimacy of virtually any product, such as medicine or trademarked products. If the product has a code printed on the packaging and a known number associated with the products manufacturer or verification then a consumer can send a message to the known number with the product code to receive an indication if the code is valid and if it has been previously checked. Benefits to this system are that if pirated products do not have a code printed on the product or have an invalid code then the user will know right away. Additionally, if multiple users check the same code then the product manufacturer or verifier can check in to if the code has been reproduced by a manufacture of a pirated product. A further benefit to the system is that the product manufacturer can immediately send an inquiry back to the user if the product is determined to be pirated or suspected of piracy. An inquiry may be to ask where/when the product was purchased, what the purchase price was and/or other information which can be used to identify the entity responsible for the piracy or distribution of pirated goods.

The process may also be such that the user sends a code to the known number to receive information if the product is authentic or a pirate product. Thereafter, the manufacturer requests a further code or alike information from the user. When using two pieces of information (and possibly another sender identity than whereto the user sent the first message) to authenticate the product, the level of security is increased.

Figure 9B:
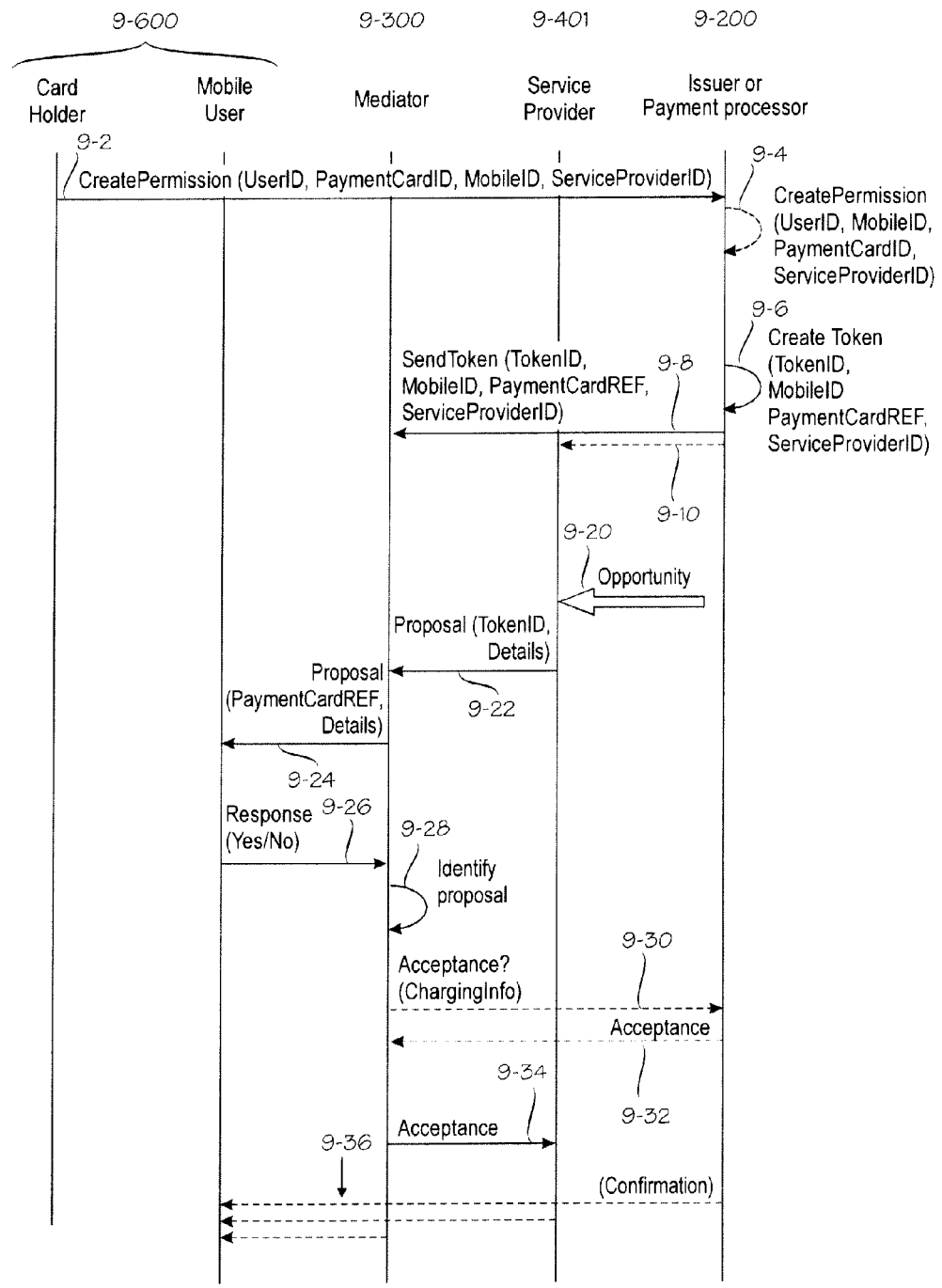
FIGS. 9B and 9C are signaling diagrams illustrating typical uses cases in the system shown in FIG. 9A.
Figure 9C:
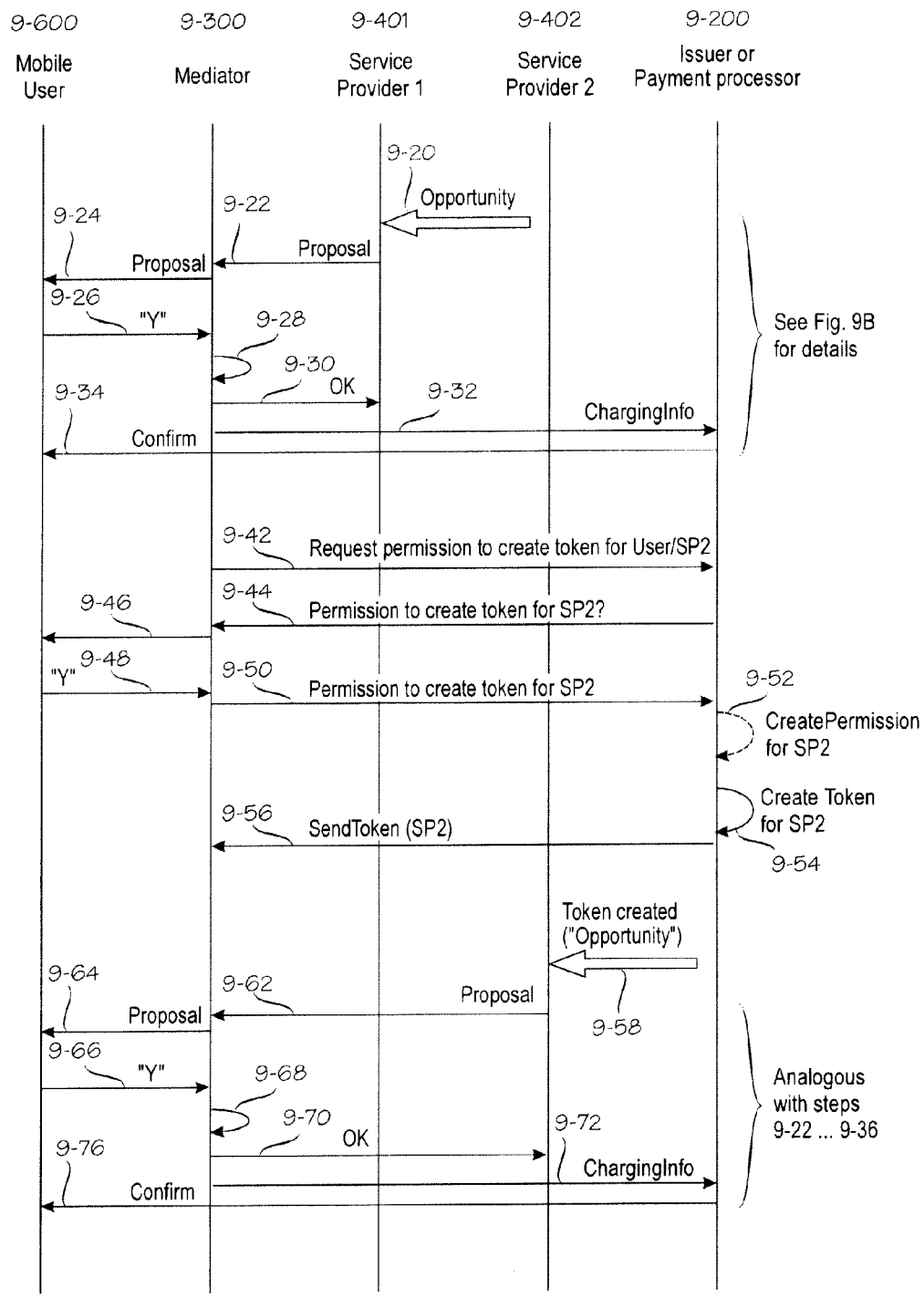

FIGS. 9A through 9C illustrate how an embodiment of the invention can be used to authorize recurring mobile payments. Specifically, FIG. 9A is a block diagram of an embodiment of the invention, which can be used to authorize mobile payments, while FIGS. 9B and 9C are signaling diagram illustrating series of events in the system shown in FIG. 9A.

As used herein, a mobile payment refers to a payment transaction effected over a mobile network.

Some of the elements shown in FIG. 9A are located in a PCI-compliant environment 9-100, wherein "PCI" stands for Payment Card Industry. Compliance specifications for the PCI-compliant environment 9-100 are published by PCI Security Standards Council, currently on address www.pcisecuritystandards.org.

The elements in the PCI-compliant environment 9-100 include a payment processor 9-200, its associated database 9-202 and at least one merchant 9-250 as a legal entity. The database 9-202 stores general account and address information 9-210 on the users and merchants. While storing such information is considered good housekeeping for auditing or the like, it is strictly speaking not essential for the present embodiment. Some of the merchants 9-250 operate respective online stores or service providers 9-400, 9-401 through 9-40n outside the PCI-compliant environment 9-100. When a representative service provider is discussed, reference numeral 9-400 is generally used, while reference numerals 9-401 through 9-40n may be used when individual service providers need to be referenced.

Other elements outside the PCI-compliant environment 9-100 include a mediator 9-300 and a number of users, a representative one of whom is denoted by reference number 9-600. The mediator 9-300 is a version of the mediators 100 described earlier, the present version being adapted to mediate between entities both inside and outside the PCI-compliant environment 9-100.

In the present embodiment, the user 9-600 has multiple roles. Firstly, the user is a customer of the processor 9-200 and accordingly, a holder of one or more payment cards, one of which is denoted by reference numeral 9-610. While reference numeral 9-610 denotes the payment card, reference numeral 9-612 denotes the information on the payment card 9-610 that suffices to globally identify the payment card. In other words, knowledge of the complete information 9-612 enables anyone having that knowledge to make payments (honest or fraudulent) that may be chargeable to the holder of the payment card 9-610. The user 9-600 is also a subscriber of a mobile access network 9-500 and a user of at least one mobile terminal 9-620.

When the system according to FIG. 9 is put into use, the following assumption and conditions are in force.

1. There is an initial trust relation between the payment processor 9-200 and mediator 9-300. For instance the trust relation may be established by legal contracts signed between the operators (as legal entities) of the processor 9-200 and mediator 9-300, and the legal entities instruct the processor 9-200 and mediator 9-300 (as network nodes) to trust each other. As used herein, an "initial trust relation" may mean, for instance, the processor 9-200 authorized the mediator 9-300 to process transactions within a set of initial limits. During operation of the system, the limits may be increased.
2. There is an initial trust relation between each service provider 9-401-9-40n and the payment processor 9-200. There is also an initial trust relation between each service provider 9-401-9-40n and the mediator 9-300.
3. There is an initial trust relation between the payment processor 9-200 and the user 9-600 as a holder of one or more payment cards 9-610.
4. There is an initial trust relation between the mediator 9-300 and the user 9-600 as a mobile subscriber using mobile terminal 9-620.

The set of initial trust relations have a few gaps, however. Firstly, because the processor 9-200 must operate in the PCI-compliant environment 9-100, it is imperative that the complete credit card information 9-612 (that is, information sufficient to make fraudulent purchases) is not conveyed outside of the PCI-compliant environment. This means, for instance, that although the mediator 9-300 is trusted to mediate payment card transactions between service providers and mobile users (as payment card holders), the mediator must be able to operate without information that globally identifies the users' payment cards. Furthermore, it is an open question what links each user's payment card(s) 9-610 and mobile terminal(s) 9-620.

It is another open question of how the various service providers 9-401 through 9-40n, or a subset of them providing mutually related services, can be authorized to offer services to a user 9-600 that has authorized mobile transactions from one service provider.

An elementary use case involving an initial transaction to an individual service provider will be described next, in connection with FIG. 9B. In step 9-2 the user 9-600 performs a registration to the web site of the processor 9-200. In the registration, the user 9-600 authorizes an exemplary service provider 9-401 to offer services that may be charged against the user's payment card 9-610. For instance, the registration may be performed over the internet by utilizing any internet-enabled terminal, which may or may not be the same terminal as the user's mobile terminal 9-620. In the registration, the user may be authenticated by utilizing bank authentication, for example. In some implementations, the initial registration 9-2 may require bank authentication or some other form of strong authentication, while subsequent uses, such as configuration changes, may require lesser authentication, such as a user ID/password combination that is issued during the initial registration 9-2.

The user effectively gives a permission for service provider 9-401 to offer services to the user 9-600, by referencing the payment card 9-610. In step 9-4, the processor 9-200 stores information on the permission given by the user 9-600. For instance, the processor 9-200 may store an information tuple 9-212 that comprises the user's true identity, mobile identity, payment card number and the service provider's identity. Again, the information tuple 9-212 is considered good housekeeping for auditing purposes while, strictly speaking, it is not absolutely necessary to effect payments.

In step 9-6 the processor 9-200 creates a "token" 9-214 that indicates to the mediator 9-300 that the information tuple 9-212 has been established. For the purposes of the present embodiment, the token 9-214 is a filtered or reduced version of the information tuple 9-212 that fully identifies the permission given by the user 9-600 to the service provider. For instance, the full identification information 9-612 on the user's payment card(s) may not be conveyed to entities outside the PCI-compliant environment. Instead of the full identification information 9-612, the token 9-614 only contains sufficient information to identify a specific payment card 9-610 to the user/card holder 9-600. In the present context, such information is shown as "PaymentCardREF" in the drawings, as this information item enables the mediator to reference the specific payment card 9-610 to the user/card holder 9-600. In the example shown, the "PaymentCardREF" information item may have a value of "VISA_4567", whereby it identifies the specific payment card among the present user's payment cards but fails to globally identify the payment card. In step 9-8, the issuer/payment processor 9-200 sends the token 9-214 to the mediator 9-300. In an optional step 9-10, the issuer/payment processor sends the token to the service provider 9-401.

In step 9-20, the service provider 9-401 detects an opportunity to send a service offer to the mobile terminal 9-620 of the user 9-600. There are many ways for the service provider 9-401 detect such an opportunity. For instance, service provider 9-401 may detect that the user is about to request or has requested some service(s) from the service provider, and the service provider may offer some related service(s) to the user. Alternatively or additionally, the user 9-600 may navigate to the service provider's web site and request information on services, thereby permitting sending of service offers to the user's mobile terminal. In step 9-22 the service provider 9-401 sends a service proposal to the mediator 9-300. The service proposal 9-22 contains an identifier of the token 9-214 that was created in step 9-6. The service proposal 9-22 further contains details of the offer, such as what is being offered and at what price, etc. In step 9-24 the mediator 9-300 reformats the offer and relays it to the user's mobile terminal 9-620. In addition to the details of the offer, the reformatted offer 9-24 contains the "PaymentCardREF" information item, which only identifies the payment card to the user/card holder 9-600 but fails to globally identify it. While the reformatted offer 9-24 is sent to the user's mobile terminal 9-620, the service provider 9-401 does not have to send the mobile ID to the mediator 9-300 because the mobile ID can be obtained from the token 9-214 that was sent to the mediator in step 9-8.

In step 9-26 the user 9-600 responds from their mobile terminal 9-620. Assuming that the DDM technique described elsewhere in this patent specification is used, the user 9-600 user only has to send a "Y" for "Yes" and anything else (including no response) for "No", for example. Similarly, the offer may contain a list of choices (e.g. A, B, C, D) from which the user selects one by replying a "A" for choice A. Even if multiple service providers 9-401-9-40$n$ are sending multiple offers each, the DDM technique keeps track of which response from the user corresponds to which service offer from which service provider. In step 9-28, the mediator 9-300 utilizes the DDM technique and thereby identifies which service offer the user is responding to. In optional steps 9-30 and 9-32 the mediator 9-300 may request acceptance from the issuer/service provider 9-200, which may perform a credit check, for example. If the outcome of the credit check is positive, the issuer/service provider 9-200 provides an acceptance to the mediator's request. The exchange of messages 9-30 and 9-32 serves two purposes. Firstly, the mediator conveys information on the user's acceptance to the issuer/payment processor 9-200 for charging purposes, and secondly, the mediator requests the issuer/payment processor 9-200 to carry any credit or security checks compliant with the policies of the issuer/payment processor. In step 9-34, provided that the outcome of the check(s) is positive, the mediator 9-300 forwards the user's acceptance to the service provider 9-401.

In step 9-36, the mediator, the issuer/service provider and/or the service provider may send a confirmation to the mobile user/card holder 9-600. Strictly speaking, the confirmation is considered good manners and good housekeeping, but is not absolutely essential for providing the requested service. In some implementations the step 9-30 through may be executed in different orders and/or by different entities. As is apparent from the drawing, after step 9-34, each of the mediator, issuer/service provider and/or service provider know equally well that everything is in order, and any entity can send the confirmation to the mobile user.

While the above steps 9-2 through 9-34 suffice to establish recurring payments in respect of one mobile user/terminal and one service provider, there is a desire to facilitate combining service offerings from multiple related service providers.

For instance, assume that the service provider 9-401 is an airline carrier. Under this assumption, the opportunity-detecting step 9-20 may be implemented such that airline carrier is an example of a merchant 9-250 inside the PCI-compliant environment 9-100, and this entity notifies the service provider 9-401, which is an example of an online store outside the PCI-compliant environment 9-100.

In some use cases the airline carrier's online store may use the opportunity 9-20 to offer additional services, in which case the payments may be processed as described in connection with FIG. 9B (initial preparatory steps 9-2 to 9-8, recurring steps 9-22 to 9-34). In an illustrative but non-exhaustive example, the first service may be an airline ticket, while the additional services may include one or more of a seat upgrade, user-selectable seat, shuttle service, or any additional service provided by the service provider 9-401 by using the token created in steps 9-6 . . . 9-8.

In other use cases it may be desirable to offer services to a user 9-600 from related service providers, wherein the mediator 9-300 has no token for the combination of user and service provider. In such cases, a number of issues should be resolved. For instance, which service providers, related to the original service provider 9-401, should be permitted to offer related services? As used herein, the original service provider means the service provider wherein the mediator has a token for that service provider and the user. While useful information on related services is often valuable to a customer, unreasonable spamming is not. Another open question is which entity should discriminate between service providers who may offer related services to the user and service providers who may not. Yet another open question which information is to be used and how in the discrimination between the service providers.

In some implementations, the mediator 9-300 determines which related service providers may send offers to the user 9-600, in a situation wherein a token exists for the user 9-600 and an original service provider 9-401. In the present context, the original service provider means the one from whom the user has requested one or more services.

There are many different techniques by which the mediator 9-300 may determine which related service providers may send related offers to the user 9-600. For instance, the operators of the various service providers (as merchants/legal entities 9-250) may agree on a set of initial trust level and a set of initial rules, and these sets of rules are delivered to the mediator. In a more ambitious implementation, the mediator 9-300 may dynamically adjust the trust level and/or the rules. For instance, the mediator 9-300 may adjust the trust level and/or rules based on implicit and/or explicit feedback from the users. In an illustrative example of implicit feedback, the mediator 9-300 monitors the acceptance rates of service offers from the service providers and increases or decreases the trust level depending on whether the acceptance rate meets or fails to meet some static or dynamic threshold value. A limitation of this technique is that the trust level of service providers is based on acceptance of the offer but the actual quality of the service is not evaluated. In an illustrative example of explicit feedback, the mediator 9-300 monitors feedback from the users, which is separate from the acceptance of service offers. Such separate feedback, which may be entered from the users' mobile terminals or web terminals, may take into account the actual quality of the service.

Assuming that service provider 2, denoted by reference numeral 9-402, is one that meets the mediator-implemented criteria such that the service provider 2 is permitted to send offers to the user 9-600 that has already accepted offers from service provider 1 (and creation of a token for that service provider 1).

Referring now to FIG. 9C, steps 9-20 through 9-34 have already been described in connection with FIG. 9B, and a duplicate description is omitted. The steps 9-20 through 9-34 are repeated in FIG. 9C for the user's convenience, with abbreviated legends.

The second major section in FIG. 9C, namely steps 9-42 through 9-56, relate to creation of a token for recurring payments from the user 9-600 to service provider 2, 9-402. What these steps accomplish, is largely analogous with creation of the token for recurring payments from the user 9-600 to service provider 1, 9-402, that was described in connection with FIG. 9B (see steps 9-2 through 9-8 for details). The actual implementation is different, however. In the token-creation phase of FIG. 9C, steps 9-42 . . . 9-56, it is not the user 9-600 who has the initiative but the mediator 9-300. Accordingly, the user need not explicitly register mobile payments for each individual service provider. On the other hand, creation of the token for the user and service provider 2 is not completely beyond the control of the user either. In a preferred implementation, the user's permission to create a token for related service providers is requested but inconvenience to the user should be restricted to the minimum. Steps 9-42 through 9-56 illustrate one way of accomplishing that.

As a result of step 9-26, the mediator 9-300 knows that the user 9-600 has authorized mobile payments for services from service provider 1, 9-401. The mediator 9-300 now uses this piece of information and, in step 9-42, prompts the processor 9-200 to request permission to create a token for the combination of user 9-600 and service provider 2, 9-402. In step 9-44 the processor 9-200 requests permission from the user 9-600 to create the token. In step 9-46 the mediator 9-300 relays the request to the mobile terminal 9-620 of the user 9-600. In the present example, the user accepts the creation of the token and sends an affirmative response (eg "Y") in step 9-48. In step 9-50 the user's permission to create the token is conveyed to the processor 9-200, which creates a record indicating the user's permission in step 9-52. In step 9-54 the payment processor creates the actual token, which is sent to the mediator in step 9-56. The three last steps of this phase, namely steps 9-52 through 9-56 are similar to the respective steps 9-4 through 9-6 in which the first token was created in FIG. 9B.

The difference to steps 9-4 through 9-6 of FIG. 9B is that in FIG. 9B the user 9-600 does not have to initiate the token-creation process, authenticate him/herself, provide any details. Instead it is the mediator that initiates the token-creation process, based on the knowledge that the user has requested service (and accepted charging) from service provider 1, for which the mediator is aware of related service providers. The mediator does not have all the required information for the token-creation process, nor does it need to have. Instead, the mediator only needs to know that the a token for the combination of the user 9-600 and service provider 2, 9-402 should be created, or that permission for its creation should be requested from the user. The remaining details for the user's permission and token, most notably the payment card identification information 9-612, are known by the processor 9-200.

It is also worth noting here that the user needs to authenticate him/herself and/or specify which offers from multiple simultaneous service offers from one or more service providers are accepted and which are declined. It is possible to utilize the DDM technique described earlier in this patent specification to provide authentication and/or matching user responses to service offerings. In some implementations the DDM technique may be omitted, at least for low-valued transactions and/or in connection with users with good history.

As a result of the token-creation process that was notified to the mediator in step 9-56, service provider 2, 9-402 is now notified of the creation of the token. This notification step 9-58 deliberately leaves open the question of which entity sends the notification. Depending on implementation, the notification can be sent from the processor 9-200 or mediator 9-300 as they both have the same information available.

Steps 9-62 through 9-76, in which the service provider 2, 9-402 sends an offer to the user 9-600 and the user accepts, are analogous with the respective steps 9-22 through 9-34, the sole difference being the service provider. In the first case (steps 9-22 through 9-34) it was service provider 1, while in the latter case (steps 9-62 through 9-76) it was service provider 2.

FIGS. 10A to 10D illustrate further variations for the embodiments described in connection with FIGS. 9A-9C. In FIGS. 10A to 10D, elements with reference numbers beginning with "10-" are described here for the first time. The remaining elements have been described in connections with earlier drawings, and a duplicate description is omitted. Elements with reference numbers 9-xxx and 10-xxx, wherein "xxx" is the same across the drawings, generally relate to similar or corresponding elements, and only the differences to the corresponding element 9-xxx are described.

Specifically, FIG. 10A shows an implementation in which the mediator, now denoted by reference numeral 10-300, resides inside the PCI-compliant environment 9-100 ("PCI"=Payment Card Industry, see description of FIG. 9A). This implementation makes it easier for the other parties, such as the operators of the issuer or payment processor 9-200 and/or merchants 9-250 or service providers 9-400, to trust the mediator.

The mediator 10-300 generally corresponds to the mediator 9-300 described in connection with FIGS. 9A-9C. The difference to the prior implementation is that the mediator 10-300 resides inside the PCI-compliant environment 9-100 and naturally complies with all of the PCI infrastructure specifications and certifications. The signaling diagrams shown in FIGS. 9B and 9C are directly applicable to the implementation shown in FIG. 10A.

The fact that the mediator 10-300 resides inside the PCI-compliant environment and complies with the PCI specifications and certifications may have a variety of different implementations, including some or all of the following:

The mediator may be implemented and operated by a legal entity whose employees undergo security clearance.

The mediator, or at least critical portions of it, are programmed or monitored by one or more well-trusted parties, and the integrity of the mediator is verified with cryptographic techniques. For instance, certificates verified by a trusted entity may be used. Alternatively or additionally, some critical portions of the mediator may be firmware coded in a manner similarly to mobile SIM cards, which are authenticated by using a challenge-response mechanism. In the case of a SIM card provided by a mobile operator, the authentication algorithm that runs on the SIM is typically given a 128-bit random number (RAND) as a challenge. The SIM runs an operators specific confidential algorithm which takes the RAND and a secret key Ki stored on the SIM as input, and produces a 32-bit response (SRES) and a 64-bit long key Kc as output. The same authentication scheme can be used in such a manner that the issuer/payment processor (as a legal entity) acts as the mobile operator acts in the SIM card example. In other words, the entire software of the mediator, or a critical subset of it, may be coded, or at least inspected, by experts trusted by the issuer/payment processor. The software, which includes the critical parts of the mediator functionality and the challenge-response mechanism, may be coded into firmware from which the mediator (as proxy server) may execute it.

Figure 10B:
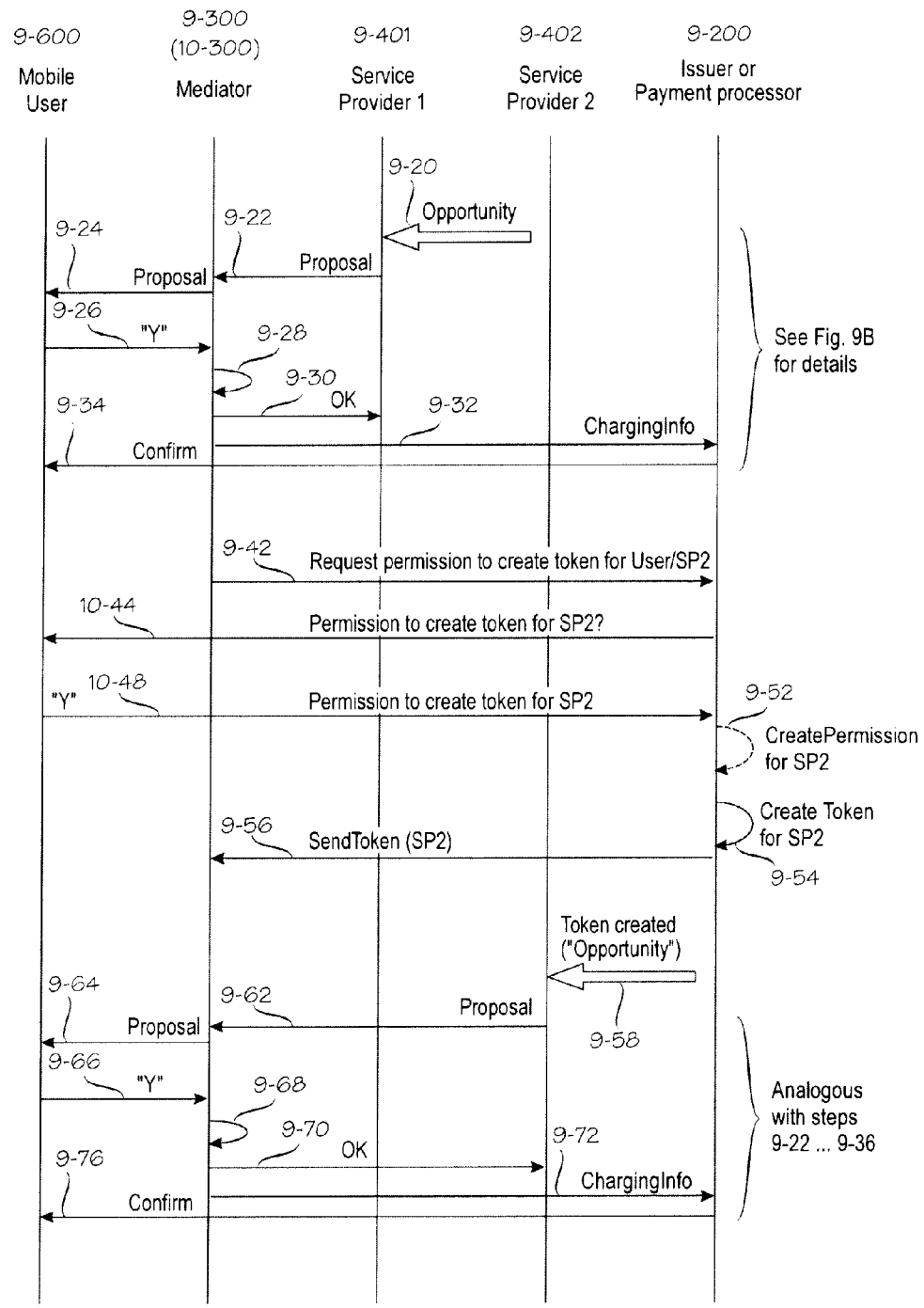
Figure 11:
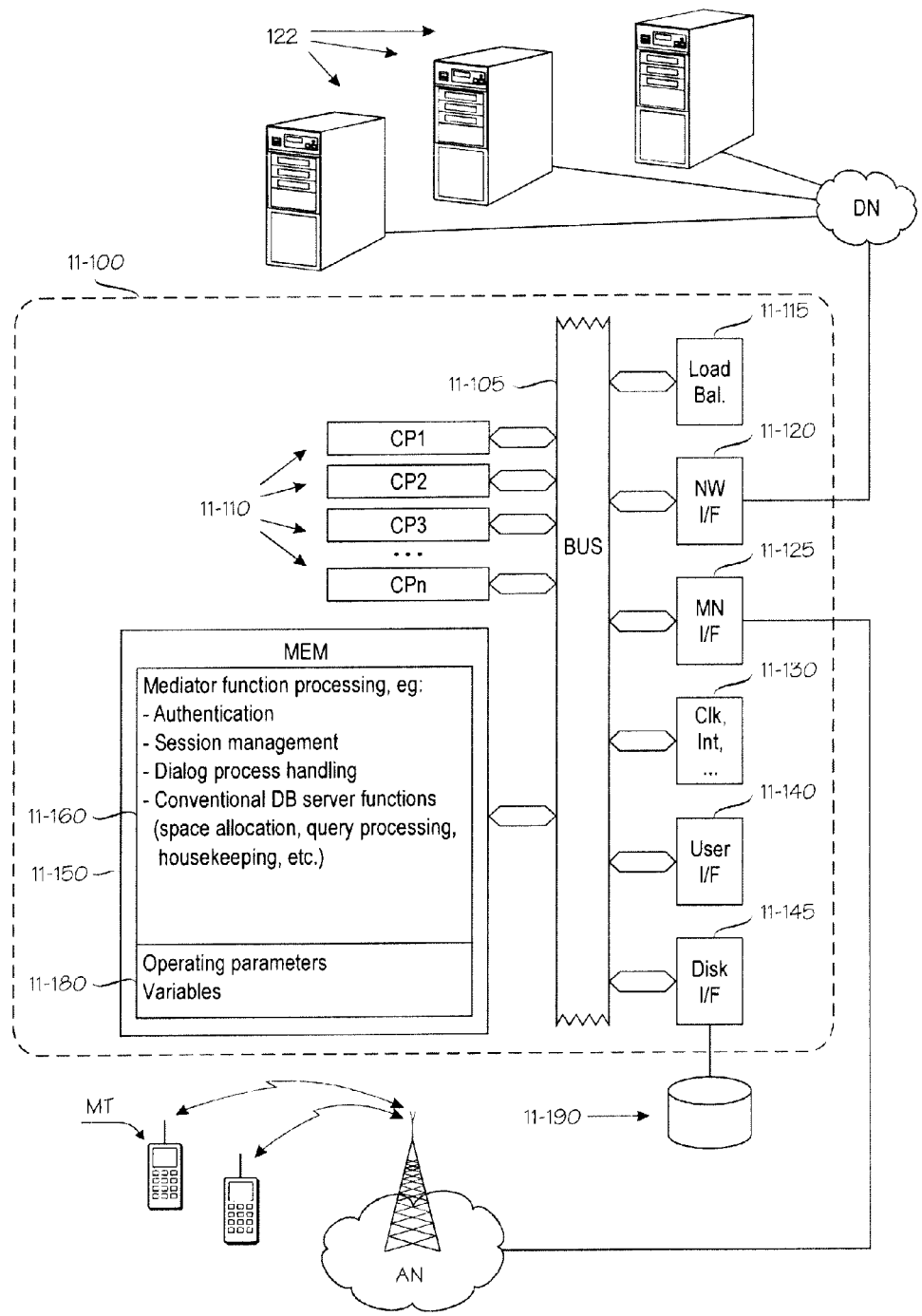
FIG. 11 schematically shows an exemplary block diagram for the various information processing and/or mediating servers in the systems described earlier.

FIG. 10B is a signaling diagram, which shows a variation from the signaling diagram shown in FIG. 9C. Compared with the previous signaling diagram, some of the tasks of the mediator are now delegated to the issuer or payment processor 9-200. In the earlier signaling diagram of FIG. 9C, the mediator performs two kinds of tasks. In step 9-42 the mediator initiates a procedure which results in creation of a token for the combination of a user N and server provider 2, provided that a token already exists for the same user N and a related service provider 1. In step 9-64 the mediator mediates a service offering from service provider 2 to the user N and relays the acceptance from user N to service provider 2 and to the issuer or payment processor. Now, suppose for an instant that the operator of the issuer of payment processor 9-200 does not trust the operator or mediator 9-300, 10-300. If the operator of the mediator was fraudulent, the mediator would have to perform these two tasks (the one beginning in step 9-42 and the one beginning in step 9-64) fraudulently. In other words, the fraudulent mediator has to send both messages 9-50 ("permission to create token for service provider 2") and 9-70 ("proposal OK") to the issuer or payment processor 9-200, without the consent of the user 9-600.

In the signaling diagram of FIG. 10B, the issuer/payment processor 9-200 directly obtains the permission to create the token for user N 9-600 and service provider 2, thus bypassing the mediator in the token-creation step. The issuer/payment processor 9-200 proposes token creation to the user in step 10-44 and obtains the user's permission in step 10-48. Step 10-44 corresponds to steps 9-44 and 9-46 of FIG. 9C, while step 10-48 corresponds to steps 9-48 and 9-50, apart from the fact that the mediator is bypassed, at least for this particular case.

Because the issuer/payment processor 9-200 is a party, which is trusted by each of the other entities, the fact that the authorization to create the token was obtained by the issuer/payment processor makes it easier for issuer/payment processor and the other entities to trust the mediator.

In a variation of the signaling diagram of FIG. 10B, the mediator may mediate the token-creation step similarly to the case shown in FIG. 9C (steps 9-48 through 9-56), but in this variation the issuer/payment processor 9-200 directly obtains the user's authorization to some or all of the individual transactions. What this means is that the mediator is bypassed in steps 9-64 through 9-72 for some or all transactions. For instance, the issuer/payment processor may decide to bypass the mediator for some or all of the following cases:

a random selection from all transactions;
all transactions whose value exceed a given threshold;
a random selection from transactions over a given threshold value;
a number of first transactions for the mediator, user and/or service provider;
a number of first transactions for a combination of user and service provider In a very ambitious scheme, some or all of the parties other than the issuer/payment processor, namely the mediator, user and service provider, have a low initial trust value. For any party, the initially low trust value is increased for any successfully completed transaction. A high-valued transaction increases the trust value of the parties of the transaction more than a low-valued transaction does. The trust value may be lowered by time, delayed payments or other forms of suspected behavior. If any party of a transaction has a low trust value, or a combination of the trust values of the parties of the transaction is low, either on an absolute scale or in comparison with the value of the current transaction, the issuer/payment processor may decide to bypass the mediator and obtain the user's authorization directly.

Figure 10C:
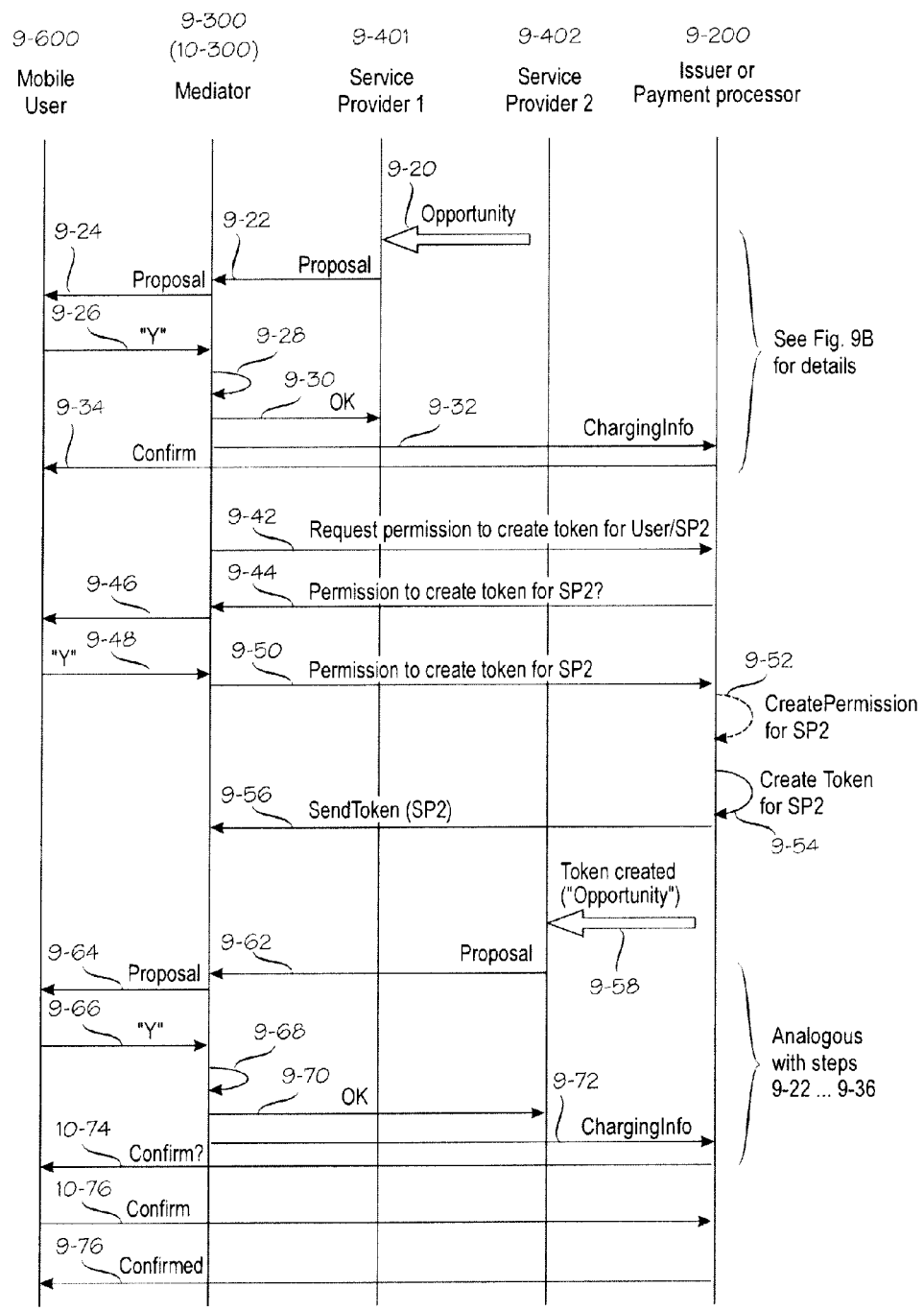

The signaling diagram of FIG. 10C shows a different variation from the one shown in FIG. 9C. In the signaling diagram of FIG. 10C, steps 9-42 through 9-56 are similar to those shown in FIGS. 9B and 9C. This means that the mediator 9-300 is in charge of obtaining the permission for the token creation from the mobile user 9-600. FIG. 10C differs from FIG. 9C in that the final confirmation 9-76 from the issuer/payment processor 9-200 to the mobile user 9-600 is preceded by a confirmation check 10-74, 10-76 between the issuer/payment processor 9-200 to the mobile user 9-600. In other words, the issuer/payment processor 9-200 may, at least for some of the individual transactions, bypass the mediator 9-300 and directly obtain the user's authorization to some perform or all of the individual transactions.

Figure 10D:
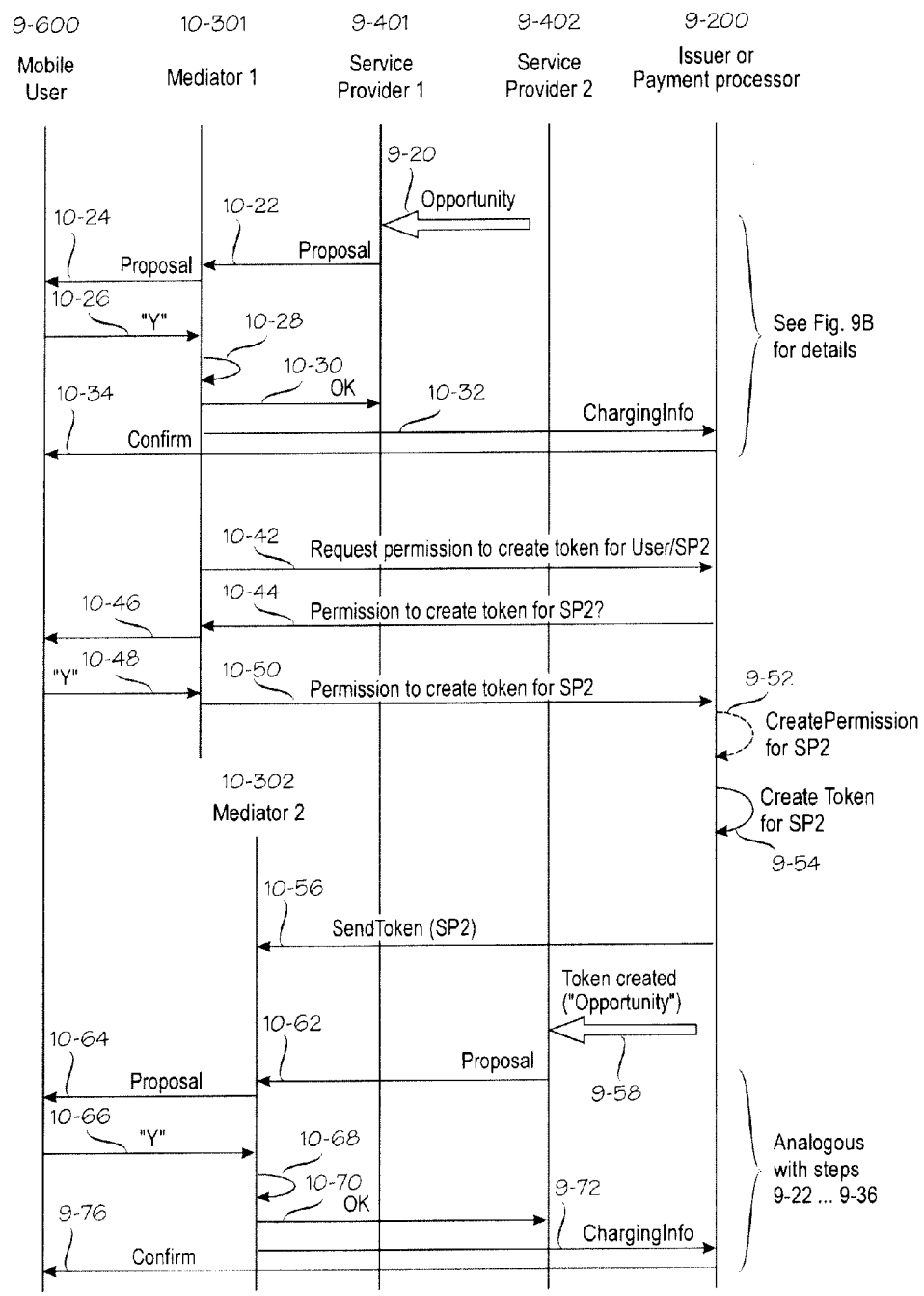

The signaling diagram of FIG. 10D shows a yet further variation from the one shown in FIG. 9C. In the present case, two mediators, denoted by reference numbers 10-301 and 10-302 have been implemented. Each of the two mediators can correspond to the mediators 9-300, 10-300 described earlier. In other words, either mediator or both of them may reside inside or outside the PCI-compliant infrastructure 9-100. The messages and acts 10-xxx performed in FIG. 10D are identical with messages and acts 9-xxx performed in FIG. 9C, apart from the fact that messages and acts up to and including message 10-50 relate to mediator 1, while messages and acts beginning at message 10-50 relate to mediator 2. In the signaling diagram of FIG. 10D, the first mediator 10-301 mediates the process of obtaining the mobile user's permission to create the token for the combination of the user and service provider 2, while the second mediator 10-302 manages the process of obtaining the mobile user's permission to carry out individual transactions.

Now, provided that the two mediators 10-301 and 10-302 are operated by mutually independent operators, the division of tasks between the two mediators makes it easier for the other parties to trust the mediators 10-301 and 10-302. This is because a single fraudulent operator cannot actually benefit from fraudulent operations. Suppose that the operator of the first mediator 10-301 was fraudulent and signaled authorizations for token creation without actually obtaining the mobile user's permission. This kind of fraudulent operation would be detected almost immediately because the confirmations for the individual transactions are mediated by the second mediator, which is operated by a different operator from that of the first mediator. Likewise, the second mediator cannot act fraudulently unless the transaction involves a service provider for whom the mobile user has already authorized recurring payments via the first mediator. What this means is that benefiting from fraudulent behavior requires cooperation from three entities, namely at least one service provider plus the operators of the two mediators.

In addition to the division of mediating task between the two mediators 10-301, 10-302, the issuer/payment processor 9-200 may, at least for some permissions and transactions, bypass one or both the mediators and directly obtain confirmations from the mobile users, as described in connection with FIGS. 10B and 10C.

Certain optional measures may be taken to further reduce the risk of fraudulent behavior. For instance, the token may have a number of restrictions associated with it. The restrictions may apply to the lifetime of the token and/or to the value of financial transactions made by using the token. The lifetime restrictions may be defined in calendar time, such as a validity period terminating on a predefined day, or in number of uses, such as token that can be used for n transactions, wherein n is an integer. Alternatively or additionally, the value of financial transactions made by using the token may be restricted. For instance, any single transaction may be limited to an upper limit or the token may expire as soon as it has been used to execute transactions totaling over a given value. The restrictions associated with the tokens may be enforced by the issuer/payment processor 9-200, the mediator(s) 9-300, 10-301, 10-302, and/or the service providers 9-401, 9-402.

FIG. 11 schematically shows an exemplary block diagram for the various information processing and/or mediating servers in the systems described earlier. For instance, such a server architecture, generally denoted by reference numeral 11-100, can be used to implement the mediators 100 and/or the servers for the service-specific systems 122, an example of which is the booking system 102. The two major functional blocks of the database server system SS are a server computer 11-100 and a storage system 11-190. The server computer 11-100 comprises one or more central processing units CP1 ... CPn, generally denoted by reference numeral 11-110. Embodiments comprising multiple processing units 11-110 are preferably provided with a load balancing unit 11-115 that balances processing load among the multiple processing units 11-110. The multiple processing units 11-110 may be implemented as separate processor components or as physical processor cores or virtual processors within a single component case. The server computer 11-100 further comprises a network interface 11-120 for communicating with various data networks, which are generally denoted by reference sign DN. The data networks DN may include local-area networks, such as an Ethernet network, and/or wide-area networks, such as the internet. Assuming that the server computer 11-100 acts as a mediator 100, it may serve one or more service-specific systems 122 via the data networks DN. Reference numeral 11-125 denotes a mobile network interface, through which the server computer 11-100 may communicate with various access networks AN, which in turn serve the mobile terminals MT used by end users or clients.

The server computer 11-100 of the present embodiment may also comprise a local user interface 11-140. Depending on implementation, the user interface 11-140 may comprise local input-output circuitry for a local user interface, such as a keyboard, mouse and display (not shown). Alternatively or additionally, management of the server computer 11-100 may be implemented remotely, by utilizing the network interface 11-120 and any internet-enabled terminal that provides a user interface. The nature of the user interface depends on which kind of computer is used to implement the server computer 11-100. If the server computer 11-100 is a dedicated computer, it may not need a local user interface, and the server computer 11-100 may be managed remotely, such as from a web browser over the internet, for example. Such remote management may be accomplished via the same network interface 11-120 that the server computer utilizes for traffic between itself and the client terminals.

The server computer 11-100 also comprises memory 11-150 for storing program instructions, operating parameters and variables. Reference numeral 11-160 denotes a program suite for the server computer 11-100.

The server computer 11-100 also comprises circuitry for various clocks, interrupts and the like, and these are generally depicted by reference numeral 11-130. The server computer 11-100 further comprises a storage interface 11-145 to the storage system 11-190. When the server computer 11-100 is switched off, the storage system 11-190 may store the software that implements the processing functions, and on power-up, the software is read into semiconductor memory 11-150. The storage system 11-190 also retains operating and variables over power-off periods. In large-volume implementations, that is, implementations wherein a single server computer 11-100 serves a large number of clients via respective mobile terminals MT, the storage system 11-190 may be used to store the dynamic dialog matrices associated with the clients and mobile terminals MT. The various elements 11-110 through 11-150 intercommunicate via a bus 11-105, which carries address signals, data signals and control signals, as is well known to those skilled in the art.

The inventive techniques may be implemented in the server computer 11-100 as follows. The program suite 11-160 comprises program code instructions for instructing the set of processors 11-110 to execute the functions of the inventive method, wherein the functions include performing the service provisioning and/or mediator features according to the invention and/or its embodiments.

The invention claimed is:

1. A method comprising performing following acts at a payment processor computer configured to manage transactions related to one or more services provided by one or more service providers and payable by one or more payment cards:
   receiving a first request to authorize recurring payments payable by a specific one of the one or more payment cards, the first request globally identifying the specific payment card;
   creating a token that identifies a specific one of the one or more service providers, wherein the token fails to globally identify the specific payment card but identifies the specific payment card within payment cards issued to a holder of the specific payment card;
   sending the created token to a first mediator server;
   receiving from a second mediator server an acceptance notification indicating that the holder of the specific payment card has used a mobile terminal via a mobile network to authorize recurring payments to the specific service provider, wherein the first mediator server and the second mediator server are the same mediator server or different mediator servers.

2. The method according to claim 1, wherein the payment processor computer causes the first or second mediator server to use the token to query if the holder of the specific payment wishes to authorize recurring payments to the specific service provider.

3. The method according to claim 1, wherein the payment processor computer verifies integrity of the first and/or second mediator server by using one or more cryptographic techniques.

4. The method according to claim 3, wherein the one or more cryptographic techniques include challenge-and-response authentication.

5. The method according to claim 3, wherein the one or more cryptographic techniques include verification of one or more certificates stored by the first and/or second mediator server.

6. The method according to claim 1, wherein the payment processor computer in less than all cases verifies the acceptance notification by bypassing the first and/or second mediator computer and by consulting the holder of the specific payment card has via the mobile terminal.

7. The method according to claim 6, wherein the payment processor computer uses some or all of the following parameters in determining the cases in which the acceptance notification is verified by bypassing the first and/or second mediator computer:
   a random selection from all transactions;
   all transactions whose value exceed a given threshold;
   a random selection from transactions over a given threshold value;
   a number of first transactions for the mediator, user and/or service provider;
   a number of first transactions for a combination of user and service provider.

8. The method according to claim 6, wherein the payment processor computer performs some or all of the following acts to determine the cases in which the acceptance notification is verified by bypassing the first and/or second mediator computer:
   assigning a first initial trust value to a plurality of holders of payment cards;
   assigning a second initial trust value to a plurality of service providers;
   assigning a third initial trust value to the first and/or second mediator computer;
   updating some or all of the initial trust values to current trust values in response to receiving notification of successfully completed transactions involving a respective one of the holders of payment cards, service providers and/or mediator servers.

9. The method according to claim 1, further comprising associating and enforcing at least one restriction with the token, wherein the at least one restriction restricts at least one of lifetime of the token and financial value of transactions made by using the token.

10. The method according to claim 1, wherein the payment processor computer and the first mediator server and second mediator server comply with specifications issued by Payment Card Industry Security Standards Council.

11. The method according to claim 1, wherein the payment processor computer and the first mediator server or the second mediator server comply with specifications issued by Payment Card Industry Security Standards Council, while the second mediator server or the first mediator server, respectively, operates outside said specifications.

12. The method according to claim 1, wherein the first request is received from a first terminal and indicates a second terminal, wherein the first terminal and second terminal use different authentication information regardless of whether the first terminal and second terminal reside in separate physical devices or share a common physical device.

13. The method according to claim 1, wherein the one or more service providers comprise a first service provider and a second service provider, the method further comprising following acts at the payment processor computer:
   receiving a second request to authorize second recurring payments to the second service provider, the second recurring payments payable by a second payment card of the one or more payment cards, wherein an association exists between services of the first service provider and services of the second service provider, and wherein the first and second payment cards may are the same payment card or separate payment cards;
   in response to the second request, using the first mediator server or the second mediator server to obtain confirmation from the holder of the payment cards that the second service provider may propose services to the holder of the payment cards;
   creating a token that identifies the second service provider, wherein the token fails to globally identify the second payment card but identifies the second payment card within payment cards issued to a holder of the payment cards;
   sending the created token to the first mediator server or the second mediator server;
   receiving from the first mediator server or the second mediator server an acceptance notification indicating that the holder of the specific payment card has used a mobile terminal via a mobile network to authorize the second recurring payments to the second service provider.

14. A method comprising performing following acts at a mediator server configured to manage transactions, which relate to one or more services provided by one or more service providers and are payable by one or more payment cards:
   receiving, from a payment processor computer, a token that identifies a specific one of the one or more service providers, wherein the token fails to globally identify the specific payment card but identifies the specific payment card within payment cards issued to a holder of the specific payment card;
   receiving, from the specific service provider, a proposal for a service that incurs recurring payments payable by one or more payment cards;
   sending a notification to a mobile terminal operated by the holder of the specific payment card, wherein the notification identifies the proposal for the service that incurs recurring payments, wherein the notification further identifies the specific payment card within payment cards issued to the holder of the specific payment card;
   receiving, from the mobile terminal operated by the holder of the specific payment card, an acceptance notification indicating that the holder of the specific payment card has used the mobile terminal via a mobile network to authorize recurring payments to the specific service provider;
   notifying the service provider and the payment processor computer of the acceptance notification.

15. The method according to claim 14, wherein the one or more service providers comprise a first service provider and a second service provider, the method further comprising following acts at the mediator server:
   sending a request to the mobile terminal operated by the holder of the specific payment card, the request requesting permission to authorize second recurring payments to the second service provider, the second recurring payments payable by a second payment card of the one or more payment cards, wherein an association exists between services of the first service provider and services of the second service provider, and wherein the first and second payment cards are the same payment card or separate payment cards;
   receiving confirmation from the mobile terminal operated by the holder of the payment cards that the second service provider may propose services to the holder of the payment cards;
   relaying said confirmation to a payment processor computer;
   receiving from the payment processor computer a second token and storing the second token, wherein the second token identifies the second service provider, wherein the second token fails to globally identify the second payment card but identifies the second payment card within payment cards issued to a holder of the payment cards.

16. The method according to claim 14, wherein the mediator server authenticates the mobile terminal operated by the holder of the specific payment card by using a non-predictable reply address for sending the notification.

17. The method according to claim 14, wherein the mediator server uses a multi-dimensional data structure to manage service offerings from multiple service providers to each of one or more mobile terminals, and wherein the mediator server identifies the service offerings from multiple service providers by varying a reply address for sending the notification.

18. The method according to claim 14, wherein the mediator server uses a multi-dimensional data structure to manage multiple phases of at least one service offering from at least one service providers to at least one mobile terminals, and wherein the mediator server identifies the multiple phases by varying a reply address for sending the notification.

19. A payment processor computer configured to manage transactions related to one or more services provided by one or more service providers and payable by one or more payment cards, the payment processor computer comprising:
   means for receiving a first request to authorize recurring payments payable by a specific one of the one or more payment cards, the first request globally identifying the specific payment card;
   means for creating a token that identifies a specific one of the one or more service providers, wherein the token fails to globally identify the specific payment card but identifies the specific payment card within payment cards issued to a holder of the specific payment card;
   means for sending the created token to a first mediator server;
   means for receiving from a second mediator server an acceptance notification indicating that the holder of the specific payment card has used a mobile terminal via a mobile network to authorize recurring payments to the specific service provider, wherein the first mediator server and the second mediator server are the same mediator server or different mediator servers.

20. The payment processor computer according to claim 19, wherein the payment processor computer is configured to cause the first or second mediator server to use the token to query if the holder of the specific payment wishes to authorize recurring payments to the specific service provider.

21. The payment processor computer according to claim 19, wherein the payment processor computer complies with specifications issued by Payment Card Industry Security Standards Council, while the mediator server operates outside said specifications.

22. A mediator server configured to manage transactions, which relate to one or more services provided by one or more service providers and are payable by one or more payment cards, the mediator server comprising:
   means for receiving, from a payment processor computer, a token that identifies a specific one of the one or more service providers, wherein the token fails to globally identify the specific payment card but identifies the specific payment card within payment cards issued to a holder of the specific payment card;
   means for receiving, from the specific service provider, a proposal for a service that incurs recurring payments payable by one or more payment cards;
   means for sending a notification to a mobile terminal operated by the holder of the specific payment card, wherein the notification identifies the proposal for the service that incurs recurring payments, wherein the notification further identifies the specific payment card within payment cards issued to the holder of the specific payment card;
   means for receiving, from the mobile terminal operated by the holder of the specific payment card, an acceptance notification indicating that the holder of the specific payment card has used the mobile terminal via a mobile network to authorize recurring payments to the specific service provider;
   means for notifying the service provider and the payment processor computer of the acceptance notification.

23. The mediator server according to claim 22, wherein the mediator server is configured to authenticate the mobile terminal operated by the holder of the specific payment card by using a non-predictable reply address for sending the notification.

24. The mediator server according to claim 22, wherein the mediator server is configured to use a multi-dimensional data structure to manage service offerings from multiple service providers to each of one or more mobile terminals, and wherein the mediator server identifies the service offerings from multiple service providers by varying a reply address for sending the notification.

25. The mediator server according to claim 22, wherein the mediator server is configured to use a multi-dimensional data structure to manage multiple phases of at least one service offering from at least one service providers to at least one mobile terminal, and wherein the mediator server identifies the multiple phases by varying a reply address for sending the notification.

26. A tangible software carrier embodying a set of computer program instructions executable in a mediator server configured to manage transactions related to one or more services provided by service providers that comprise a first service provider and a second service provider, the transactions being payable by one or more payment cards;
   wherein execution of the computer program instructions causes the following acts in the mediator server:
      receiving, from a payment processor computer, a token that identifies a specific one of the one or more service providers, wherein the token fails to globally identify the specific payment card but identifies the specific payment card within payment cards issued to a holder of the specific payment card;
      receiving, from the specific service provider, a proposal for a service that incurs recurring payments payable by one or more payment cards;
      sending a notification to a mobile terminal operated by the holder of the specific payment card, wherein the notification identifies the proposal for the service that incurs recurring payments, wherein the notification further identifies the specific payment card within payment cards issued to the holder of the specific payment card;
      receiving, from the mobile terminal operated by the holder of the specific payment card, an acceptance notification indicating that the holder of the specific payment card has used the mobile terminal via a mobile network to authorize recurring payments to the specific service provider;
      notifying the service provider and the payment processor computer of the acceptance notification.

27. A payment processor computer configured to manage transactions related to one or more services provided by one or more service providers and payable by one or more payment cards, the payment processor computer comprising:
- at least one network interface for communicating with other entities over one or more wired or wireless network;
- a first set of computer program instructions for using the at least one network interface to receive a first request to authorize recurring payments payable by a specific one of the one or more payment cards, the first request globally identifying the specific payment card;
- a second set of computer program instructions for creating a token that identifies a specific one of the one or more service providers, wherein the token fails to globally identify the specific payment card but identifies the specific payment card within payment cards issued to a holder of the specific payment card;
- a third set of computer program instructions for using the at least one network interface to send the created token to a first mediator server;
- a fourth set of computer program instructions for using the at least one network interface to receive from a second mediator server an acceptance notification indicating that the holder of the specific payment card has used a mobile terminal via a mobile network to authorize recurring payments to the specific service provider, wherein the first mediator server and the second mediator server are the same mediator server or different mediator servers.

28. A mediator server configured to manage transactions, which relate to one or more services provided by one or more service providers and are payable by one or more payment cards, the mediator server comprising:
- at least one network interface for communicating with other entities over one or more wired or wireless network;
- a first set of computer program instructions for using the at least one network interface to receive, from a payment processor computer, a token that identifies a specific one of the one or more service providers, wherein the token fails to globally identify the specific payment card but identifies the specific payment card within payment cards issued to a holder of the specific payment card;
- a second set of computer program instructions for using the at least one network interface to receiving, from the specific service provider, a proposal for a service that incurs recurring payments payable by one or more payment cards;
- a third set of computer program instructions for using the at least one network interface to send a notification to a mobile terminal operated by the holder of the specific payment card, wherein the notification identifies the proposal for the service that incurs recurring payments, wherein the notification further identifies the specific payment card within payment cards issued to the holder of the specific payment card;
- a fourth set of computer program instructions for using the at least one network interface to receive, from the mobile terminal operated by the holder of the specific payment card, an acceptance notification indicating that the holder of the specific payment card has used the mobile terminal via a mobile network to authorize recurring payments to the specific service provider;
- a fifth set of computer program instructions for using the at least one network interface to notify the service provider and the payment processor computer of the acceptance notification.

* * * * *